(12) United States Patent
Filardo

(10) Patent No.: US 8,610,304 B2
(45) Date of Patent: Dec. 17, 2013

(54) MECHANISMS FOR CREATING UNDULATING MOTION, SUCH AS FOR PROPULSION, AND FOR HARNESSING THE ENERGY OF MOVING FLUID

(75) Inventor: Benjamin Pietro Filardo, New York, NY (US)

(73) Assignee: Pliant Energy Systems LLC, Brooklyn, NY (US)

(*) Notice: Subject to any disclaimer, the term of this patent is extended or adjusted under 35 U.S.C. 154(b) by 85 days.

(21) Appl. No.: 13/347,601

(22) Filed: Jan. 10, 2012

(65) Prior Publication Data
US 2012/0175880 A1    Jul. 12, 2012

Related U.S. Application Data

(63) Continuation-in-part of application No. 12/617,618, filed on Nov. 12, 2009, now Pat. No. 8,432,057, and a continuation-in-part of application No. 12/242,144, filed on Sep. 30, 2008, now Pat. No. 7,696,634, and a continuation-in-part of application No. 12/150,910, filed on May 1, 2008, now abandoned.

(60) Provisional application No. 60/926,984, filed on May 1, 2007, provisional application No. 61/431,412, filed on Jan. 10, 2011.

(51) Int. Cl.
*H02P 9/04* (2006.01)
(52) U.S. Cl.
USPC .............................................. 290/54; 290/43
(58) Field of Classification Search
USPC ................... 290/42, 43, 53, 54; 310/330, 367; 60/527
See application file for complete search history.

(56) References Cited

U.S. PATENT DOCUMENTS

| | | | |
|---|---|---|---|
| 2,436,517 | A | 2/1948 | Lewis |
| 3,190,618 | A | 6/1965 | Katzen |
| 3,467,013 | A | 9/1969 | Conner |
| 3,623,566 | A | 11/1971 | Orloff et al. |
| 3,816,774 | A | 6/1974 | Ohnuki et al. |
| 3,942,465 | A | 3/1976 | Bouix |
| 3,961,863 | A | 6/1976 | Hooper, III |

(Continued)

FOREIGN PATENT DOCUMENTS

| AU | 2006203202 A1 | 2/2007 |
|---|---|---|
| CA | 2554316 A1 | 1/2007 |

(Continued)

OTHER PUBLICATIONS

International Search Report and Written Opinion corresponding to PCT/US12/20836 mailed May 8, 2012.

(Continued)

*Primary Examiner* — Tho D Ta
*Assistant Examiner* — Viet Nguyen
(74) *Attorney, Agent, or Firm* — Irell & Manella LLP

(57) ABSTRACT

Mechanisms are described which receive and transfer forces via transducers having one or more persistent deformations in changeable locations. Actuator or propulsion embodiments are powered by elastic or variable length transducers that exert forces on the deformed members which in turn exert forces onto ambient fluid such as air or water. Generator embodiments receive forces from ambient moving fluid via deformed members which transfer those forces to elastic or variable length transducers which convert those forces into electrical energy.

51 Claims, 19 Drawing Sheets

(56) References Cited

U.S. PATENT DOCUMENTS

| | | | |
|---|---|---|---|
| 4,056,742 A | 11/1977 | Tibbetts | |
| 4,151,424 A * | 4/1979 | Bailey | 290/54 |
| 4,164,383 A | 8/1979 | French | |
| 4,257,640 A | 3/1981 | Wiley | |
| 4,269,906 A | 5/1981 | Schmechtig | |
| 4,310,264 A | 1/1982 | Brownlee | |
| 4,371,788 A * | 2/1983 | Smith, Jr. | 290/42 |
| 4,375,151 A | 3/1983 | French | |
| 4,387,318 A | 6/1983 | Kolm et al. | |
| 4,448,020 A | 5/1984 | Wood et al. | |
| 4,469,596 A | 9/1984 | Kantor | |
| 4,476,397 A * | 10/1984 | Lawson | 290/54 |
| 4,488,854 A | 12/1984 | Miller | |
| 4,498,850 A | 2/1985 | Perlov et al. | |
| 4,558,954 A | 12/1985 | Barr | |
| 4,830,315 A | 5/1989 | Presz, Jr. et al. | |
| 5,152,674 A | 10/1992 | Marx | |
| 5,192,197 A * | 3/1993 | Culp | 417/322 |
| 5,230,656 A | 7/1993 | Paterson et al. | |
| 5,611,666 A * | 3/1997 | Au et al. | 416/82 |
| 5,820,342 A | 10/1998 | Au et al. | |
| 5,826,535 A | 10/1998 | Shaw | |
| 5,950,726 A | 9/1999 | Roberts | |
| 5,961,289 A | 10/1999 | Lohmann | |
| 5,961,298 A | 10/1999 | Bar-cohen | |
| 5,975,865 A | 11/1999 | Manabe | |
| 6,069,420 A * | 5/2000 | Mizzi et al. | 310/40 MM |
| 6,079,214 A | 6/2000 | Bishop | |
| 6,106,249 A | 8/2000 | Barak | |
| 6,109,888 A | 8/2000 | Marshall | |
| 6,153,944 A | 11/2000 | Clark | |
| 6,250,585 B1 | 6/2001 | Pell | |
| 6,327,994 B1 | 12/2001 | Labrador | |
| 6,357,997 B1 | 3/2002 | Rosefsky | |
| 6,361,284 B2 | 3/2002 | Drevet | |
| 6,411,015 B1 | 6/2002 | Toda | |
| 6,424,079 B1 | 7/2002 | Carroll | |
| 6,435,849 B1 | 8/2002 | Guilmette | |
| 6,579,068 B2 | 6/2003 | Bridger et al. | |
| 6,628,040 B2 * | 9/2003 | Pelrine et al. | 310/307 |
| 6,911,764 B2 | 6/2005 | Pelrine et al. | |
| 6,948,910 B2 | 9/2005 | Polacsek | |
| 6,952,058 B2 | 10/2005 | Mccoin | |
| 7,034,432 B1 | 4/2006 | Pelrine et al. | |
| 7,064,472 B2 | 6/2006 | Pelrine et al. | |
| 7,148,579 B2 | 12/2006 | Pinkerton et al. | |
| 7,166,952 B2 | 1/2007 | Topliss et al. | |
| 7,196,450 B2 | 3/2007 | Pinkerton et al. | |
| 7,204,731 B2 | 4/2007 | Gusler et al. | |
| 7,229,029 B2 | 6/2007 | Windham | |
| 7,244,151 B2 | 7/2007 | Gusler et al. | |
| 7,300,323 B1 | 11/2007 | Bandyopadhyay et al. | |
| 7,352,073 B2 | 4/2008 | Ames | |
| 7,357,684 B2 | 4/2008 | Gusler | |
| 7,362,032 B2 * | 4/2008 | Pelrine et al. | 310/309 |
| 7,387,179 B2 | 6/2008 | Anhalt | |
| 7,470,086 B2 | 12/2008 | Jennings et al. | |
| 7,492,054 B2 | 2/2009 | Catlin | |
| 7,493,759 B2 | 2/2009 | Bernitsas et al. | |
| 7,573,143 B2 | 8/2009 | Frayne | |
| 7,626,281 B2 * | 12/2009 | Kawai | 290/54 |
| 7,649,276 B2 * | 1/2010 | Kornbluh et al. | 290/53 |
| 7,696,634 B2 * | 4/2010 | Filardo | 290/54 |
| 7,737,608 B2 | 6/2010 | Ruggeri et al. | 310/339 |
| 7,839,007 B2 * | 11/2010 | Filardo | 290/43 |
| 7,863,768 B2 * | 1/2011 | Filardo | 290/54 |
| 8,102,072 B2 * | 1/2012 | Tsou | 290/55 |
| 8,120,195 B2 * | 2/2012 | Pollack et al. | 290/53 |
| 8,142,154 B2 * | 3/2012 | Gartner | 416/81 |
| 8,426,999 B2 * | 4/2013 | Drevet | 290/54 |
| 8,432,057 B2 * | 4/2013 | Filardo | 290/54 |
| 2001/0010348 A1 | 8/2001 | Bilanin et al. | |
| 2002/0146333 A1 * | 10/2002 | Drevet | 417/410.1 |
| 2003/0102411 A1 | 6/2003 | Kota et al. | |
| 2004/0008853 A1 | 1/2004 | Pelrine et al. | |
| 2004/0043677 A1 | 3/2004 | Yamamoto | |
| 2004/0197519 A1 | 10/2004 | Elzey et al. | |
| 2006/0145030 A1 | 7/2006 | Cowan et al. | |
| 2006/0172629 A1 | 8/2006 | Gusler | |
| 2006/0192389 A1 | 8/2006 | Perry et al. | |
| 2006/0258912 A1 * | 11/2006 | Belson et al. | 600/152 |
| 2007/0031667 A1 * | 2/2007 | Hook et al. | 428/373 |
| 2007/0222344 A1 | 9/2007 | Kornbluh | |
| 2008/0087762 A1 | 4/2008 | Holloman et al. | |
| 2008/0128560 A1 | 6/2008 | Hyde | |
| 2008/0229745 A1 | 9/2008 | Ghouse | |
| 2009/0058095 A1 | 3/2009 | McClintic | |
| 2009/0134623 A1 | 5/2009 | Krouse | |
| 2010/0026003 A1 | 2/2010 | Filardo | |
| 2010/0045036 A1 | 2/2010 | Filardo | |
| 2010/0078941 A1 | 4/2010 | Filardo | |
| 2010/0084871 A1 | 4/2010 | Filardo | |
| 2010/0133387 A1 | 6/2010 | Wood et al. | |
| 2010/0133848 A1 | 6/2010 | Piasecki | |

FOREIGN PATENT DOCUMENTS

| | | |
|---|---|---|
| DE | 102005046516 A1 | 4/2007 |
| EP | 0322899 A2 | 7/1989 |
| EP | 1219834 A1 | 7/2002 |
| EP | 1783843 A2 | 5/2007 |
| GB | 2081816 A | 2/1982 |
| GB | 2129059 A | 10/1984 |
| RU | 2347944 C2 | 2/2009 |
| WO | WO0202309 A1 | 1/2002 |
| WO | 2007029275 A1 | 3/2007 |

OTHER PUBLICATIONS

"Anaconda wave-power generator snakes into next stage of production," by Alok Jham, http://www.guardian.co.uk/environment/2009/may/06/anaconda-wave-power, May 6, 2009.

"Checkmate Seaenergy are proud to present the Anaconda Wave Energy Converter," Introduction page, http://www.checkmateuk.com/seaenergy/introduction.html.

"Checkmate Seaenergy are proud to present the Anaconda Wave Energy Converter," the Anaconda System page, http://www.checkmateuk.com/seaenergy/system.html.

"Checkmate Seaenergy are proud to present the Anaconda Wave Energy Converter," Economics page, http://www.checkmateuk.com/seaenergy/economics.html.

"Checkmate Seaenergy are proud to present the Anaconda Wave Energy Converter," Technology page, http://www.checkmateuk.com/seaenergy/technology.html.

"Checkmate Seaenergy are proud to present the Anaconda Wave Energy Converter," Wave Energy Potential page, http://www.checkmateuk.com/seaenergy/potential.html.

"Checkmate Seaenergy are proud to present the Anaconda Wave Energy Converter," the Anaconda Team page, http://www.checkmateuk.com/seaenergy/team.html.

"Checkmate Seaenergy are proud to present the Anaconda Wave Energy Converter," Downloads and Links page, http://www.checkmateuk.corn/seaenergy/links.html.

"Checkmate Seaenergy are proud to present the Anaconda Wave Energy Converter," Project News page, http://www.checkmateuk.com/seaenergy/news.html.

"VIVACE (Vortex Induced Vibrations Aquatic Clean Energy)," Technology page, http://www.vortexhydroenergy.com/html/technology.html.

"Harnessing river whirlpools puts energy on tap," by Jim Giles, http://www.newscientist.com/article/mg19826516.200-harnessing-river-. . . . 1. Apr. 11, 2008.

PCT International Search Report and Written Opinion, mailed Aug. 01, 2008 for PCT/US08/05605, filed May 1, 2008.

PCT International Search Report and Written Opinion, mailed Dec. 24, 2009 for PCT/US09/62257, filed Oct. 27, 2009.

PCT International Search Report and Written Opinion, mailed Jan. 27, 2010 for PCT/US09/64241, filed Nov. 12, 2009.

Supplementary European Search Report and European Search Opinion, dated Jun. 20, 2012 for EP Application No. 09847665.8, filed Nov. 12, 2009.

* cited by examiner

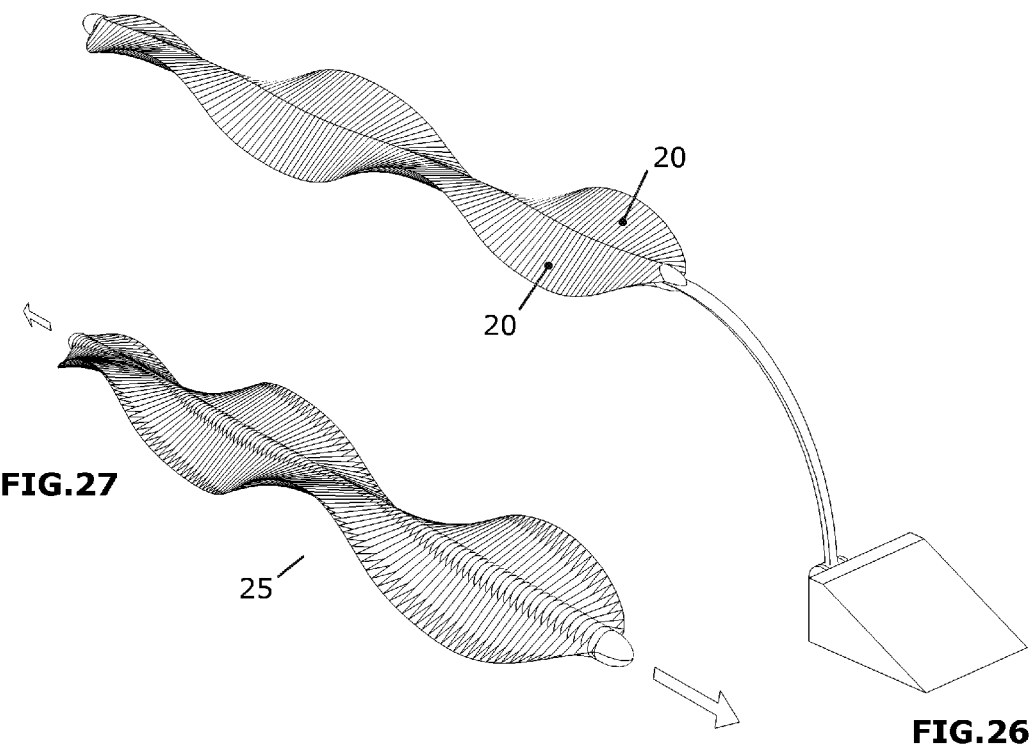
FIG.27
FIG.26
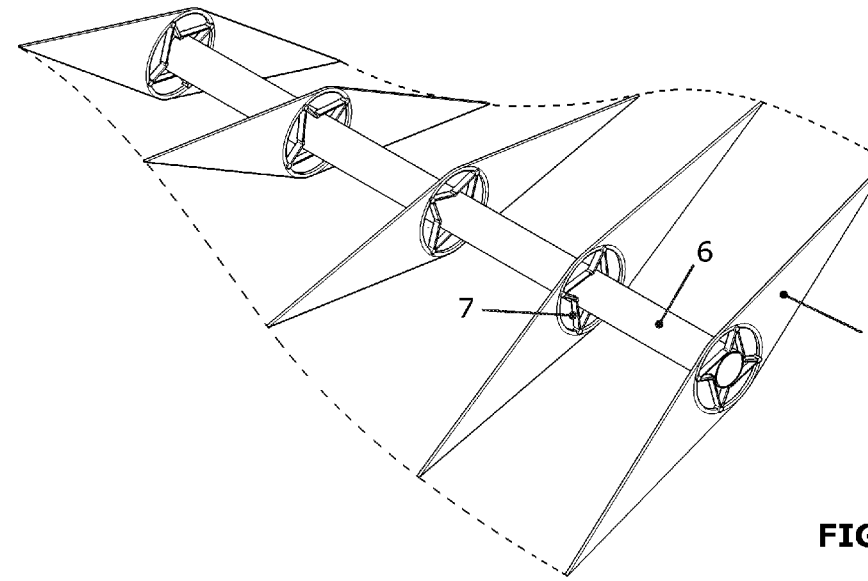
FIG.28

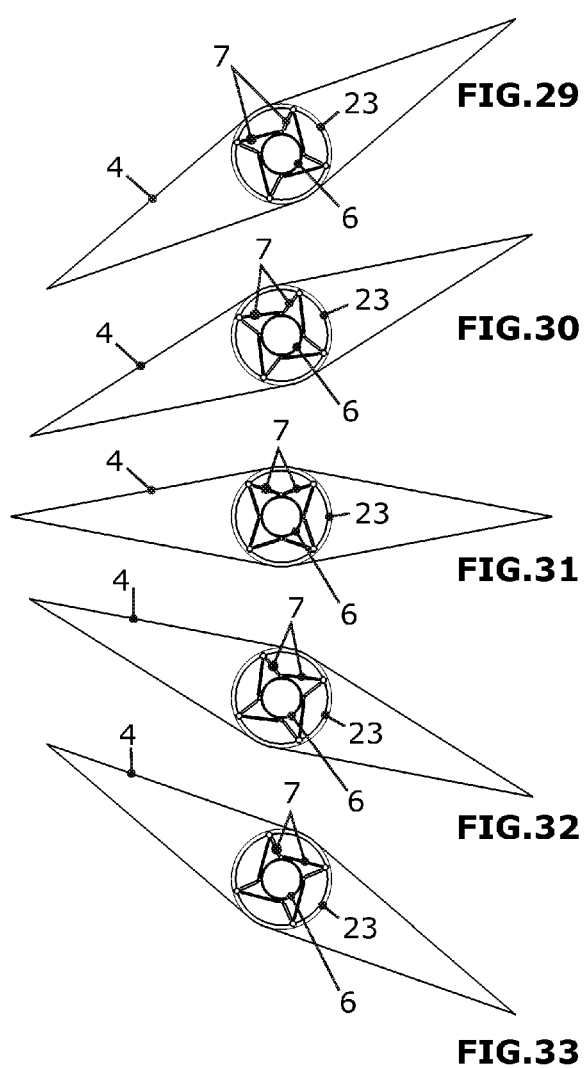
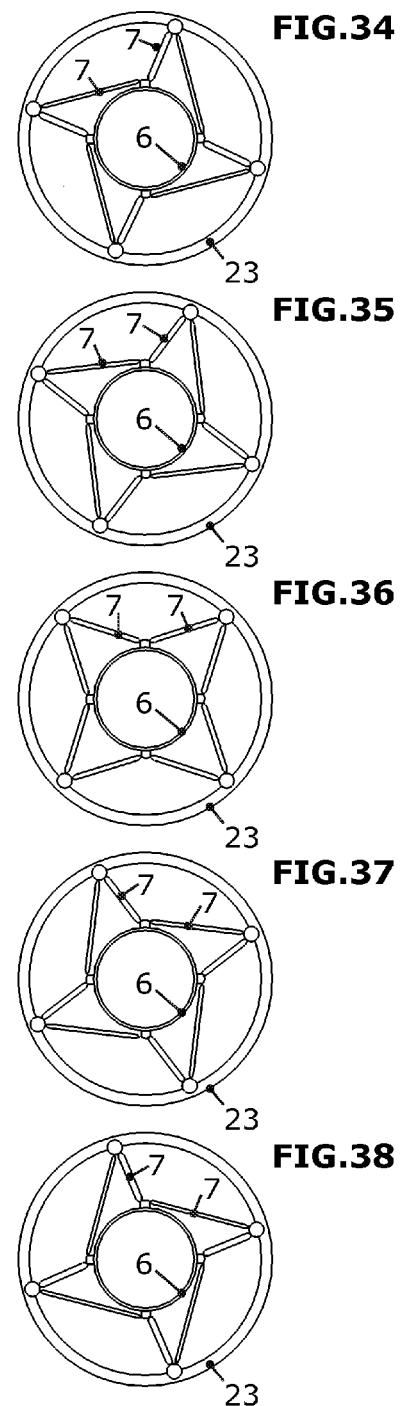

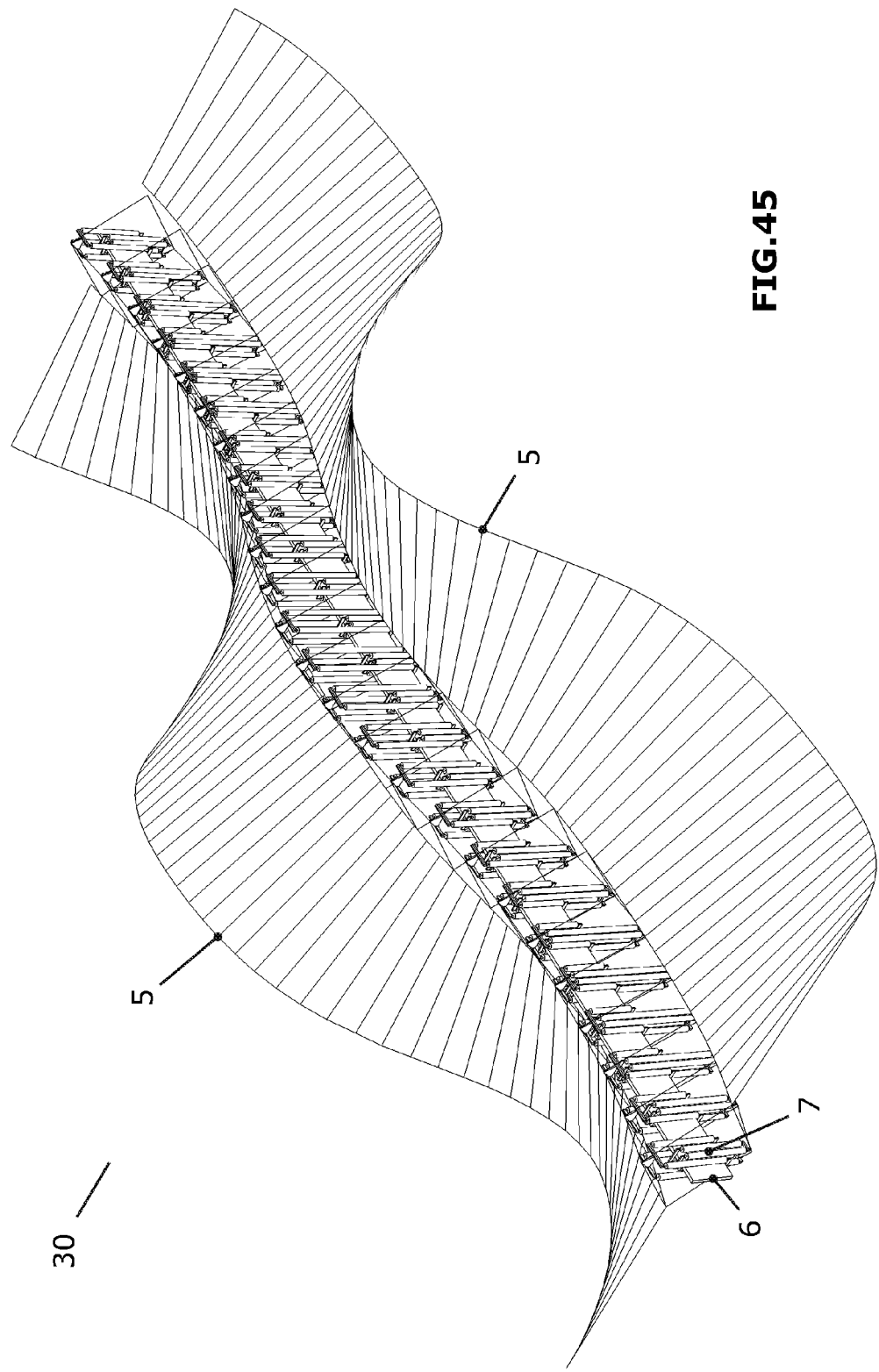

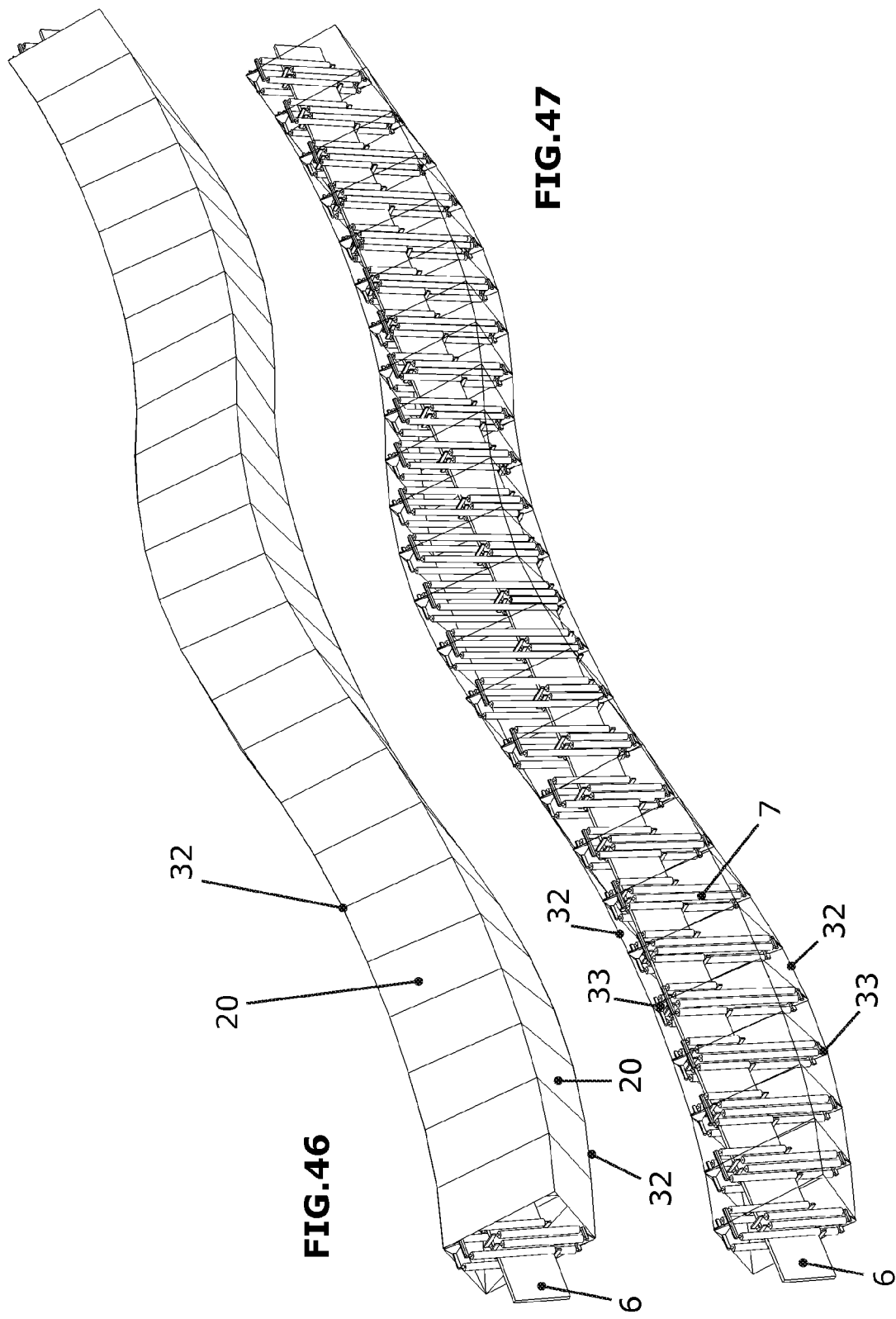

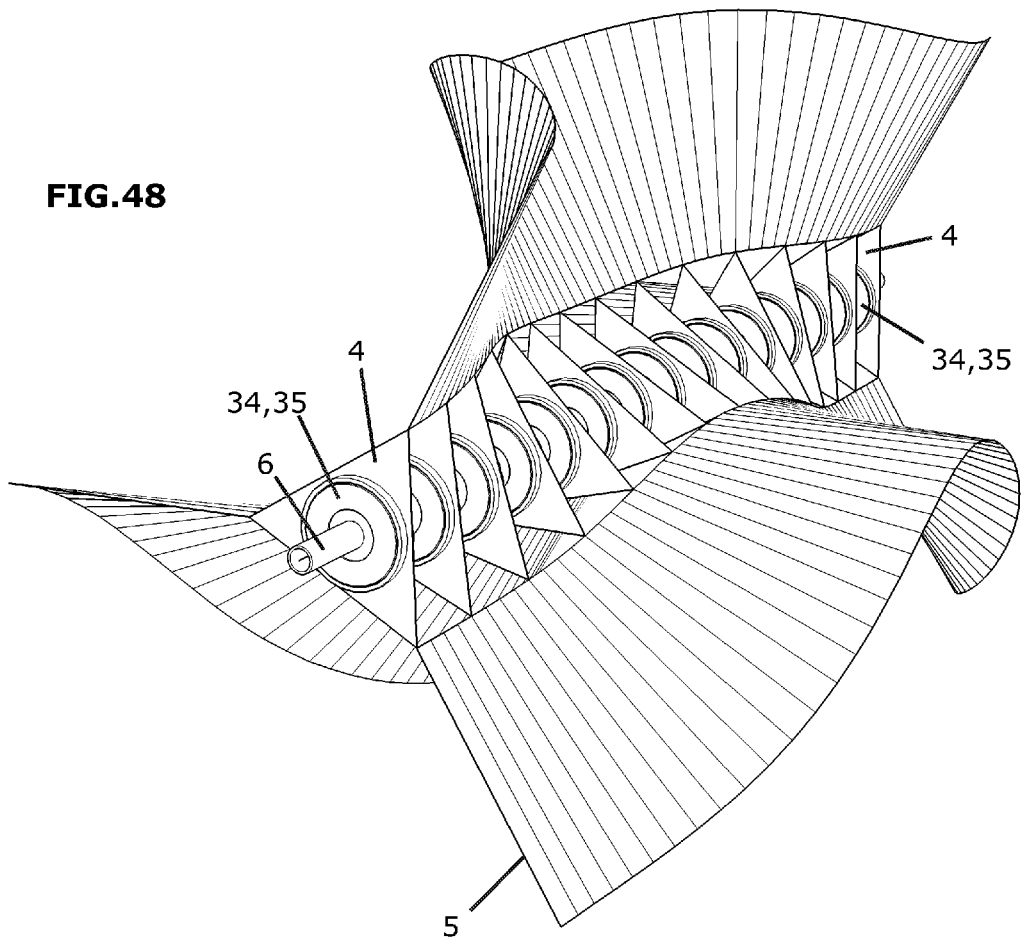

8,610,304 B2

MECHANISMS FOR CREATING UNDULATING MOTION, SUCH AS FOR PROPULSION, AND FOR HARNESSING THE ENERGY OF MOVING FLUID

PRIORITY CLAIM AND RELATED APPLICATIONS

This application is a Non-Provisional of and claims priority under 35 U.S.C. §119 to prior U.S. provisional patent application Ser. No. 61/431,412 entitled, "MECHANISMS FOR CREATING UNDULATING MOTION, SUCH AS PROPULSION, AND FOR HARNESSING THE ENERGY OF MOVING FLUID," filed Jan. 10, 2011.

This application is also a Continuation-In-Part of and claims priority under 35 U.S.C. §120 to co-pending U.S. non-provisional patent application Ser. No. 12/617,618 entitled, "Pliant or Compliant Elements for Harnessing the Forces of Moving Fluid to Transport Fluid or Generate Electricity," filed Nov. 12, 2009; which in turn claims priority under 35 U.S.C. §120 to prior non-provisional patent application Ser. No. 12/242,144 entitled, "PLIANT MECHANISMS FOR EXTRACTING POWER FROM MOVING FLUID," filed Sep. 30, 2008, which in turn claims priority under 35 U.S.C. §120 to U.S. non-provisional patent application Ser. No. 12/150,910 entitled, "Power generator for extracting power from fluid motion," filed May 1, 2008, which in turn claims priority under U.S.C. §119 to U.S. provisional patent application Ser. No. 60/926,984 filed May 1, 2007.

All of the aforementioned applications are expressly incorporated herein by reference.

TECHNICAL FIELD

Disclosed are apparatuses, methods and systems which, in various embodiments, facilitate the conversion of mechanical energy into electrical energy and/or facilitate the conversion of electrical energy into mechanical energy.

BACKGROUND

Mechanical devices actuated to perform prescribed motions for a variety of purposes are ubiquitous. Less common are actuated devices that create a prescribed, repetitive undulating motion, or effect. A variety of mechanical and/or electrical devices have come about to either harness the kinetic energy of moving fluids, or to create the movement of the fluids themselves. For example, seafaring vessels may employ a propeller, powered by a mechanical engine, to move through the water. There are also devices developed to harness the power of moving fluid, whereby an electromagnetic generator is coupled to the fluid, such as by a turbine wheel, to produce electrical energy for distribution and consumption by all manner of electrical-energy-powered devices.

SUMMARY

Embodiments of the disclosed apparatuses, methods and systems may be directed to devices which create repetitive and/or undulating motion, or effect, to produce useful work, such as for a propulsion system or other system. These and alternative embodiments may further be directed to devices which exhibit this same undulating motion when external forces are applied, and where this undulating motion is coupled to electricity generating components. Such uses are a consequence of a functional symmetry between actuation and energy harnessing, as between an electromagnetic motor and an electromagnetic generator.

In some embodiments, flexible sheet-like members are deformed with applied force and the resulting deformation or deformations are maintained through restraining components.

In one embodiment the restraining components are vertebra plates to which the deformed, flexible sheet-like members are attached in such a manner that they are unable to return to their relaxed state. In some implementations, the vertebrae plates may be elastically or variably-coupled to a central rigid tube or member. The elastic or variable coupled components may, in various implementations, be comprised of electroactive polymer material, a magnetostrictive material, a metal coil passing through a magnetic field, hydraulic pistons, pneumatic pistons, shape memory alloy elements, and/or the like.

For propulsion embodiments, when the elastic or variable coupling components are actuated with an input of energy, such as an excitation, they will change length and impart forces onto the deformed, flexible sheet-like members, causing their deformations to shift position. In this manner the elastic or variably-coupled actuators create undulation motion along the flexible sheet-like members which may impart force onto ambient fluid to create thrust.

For generator embodiments secured in the directional flow of fluid, the kinetic energy of the fluid imparts force onto the flexible sheet-like member, causing the positions of the deformations to shift in the direction of the fluid flow. Back and forth fluid flow may cause the deformations to move back and forth. Unidirectional fluid flow may cause the deformations to travel in one direction until they move off the downstream end of the flexible sheet-like member.

Because these deformations result from the internal energy state of the flexible sheet-like member created during fabrication, these deformations cannot be eliminated so long as the restraints remain. Therefore, when a deformation moves off the downstream end of the flexible sheet-like member, another one must come into existence at the upstream end. When the mechanism is anchored in a fluid stream, a series of undulating deformations may travel continuously along the flexible sheet-like member in the direction of the fluid stream. In one generator embodiment, the flexible sheet-like members may be coupled to vertebra plates so that movement of the deformations of the flexible sheet-like members powers the movement of the vertebra plates. The movement of the vertebra plates imparts force onto the elastic or variable coupling components. The elastic or variable coupling component may incorporate transducing components which convert this force into electrical energy. The elastic coupling components may, in some implementations, be constructed of and/or incorporate an electroactive polymer or other electroactive material able to convert mechanical strain into electrical energy. The elastic coupling component may also, in some implementations, be constructed of a magnetostrictive material, a metal coil passing through a magnetic field, hydraulic pistons, pneumatic pistons, shape memory alloy elements, and/or the like.

The architecture of the system may be the same or similar for certain propulsion and pump embodiments. For example, the difference between some pump and propulsion embodiments is that the elastic or variable coupling components of the propulsion and pump embodiments are actuators rather than generators. In other words, in propulsion embodiments the elastic or variable coupling components convert electrical energy into mechanical action FIG. 1 whereas in the generator embodiments the elastic or variable coupling components convert mechanical action into electrical energy, FIG. 2.

The mechanisms, including apparatuses, methods and systems, discussed herein are not dependent on any particular actuator technology nor on any particular generator technology.

BRIEF DESCRIPTION OF THE FIGURES

FIG. 26 illustrates some aspects of an embodiment without CS fins 5 and with widened vertebra plates 4;

FIG. 27 illustrates some aspects of a propulsion embodiment;

FIG. 28 illustrates further detail of the embodiment in FIG. 26 with longitudinal strips 21 removed to show vertebra plates 4, tendons 7 and central member 6;

FIGS. 29-33 illustrate some aspects of sequences of operation of single vertebra plate 4 of an embodiment;

FIGS. 34-38 illustrate some aspects of the sequences of operation shown in FIGS. 29-33 from a closer view without the vertebra plate 4;

FIG. 45 illustrates some aspects of a bilateral reciprocating embodiment with the longitudinal strips 20 removed to show the central member 4, and tendons 7;

FIG. 46 illustrates some aspects of a bilateral reciprocating embodiment with its CS fins 5 removed;

FIG. 47 illustrates some aspects of a bilateral reciprocating embodiment of FIG. 46 with its CS fins 5 removed and its longitudinal strips 20 removed;

FIG. 48 illustrates some aspects of a generator embodiment in which the transducer of at least one vertebra is an electromagnetic generator and illustrates a propulsion embodiment in which the transducer of at least one vertebra is an electric motor.

DETAILED DESCRIPTION

Figure 1:
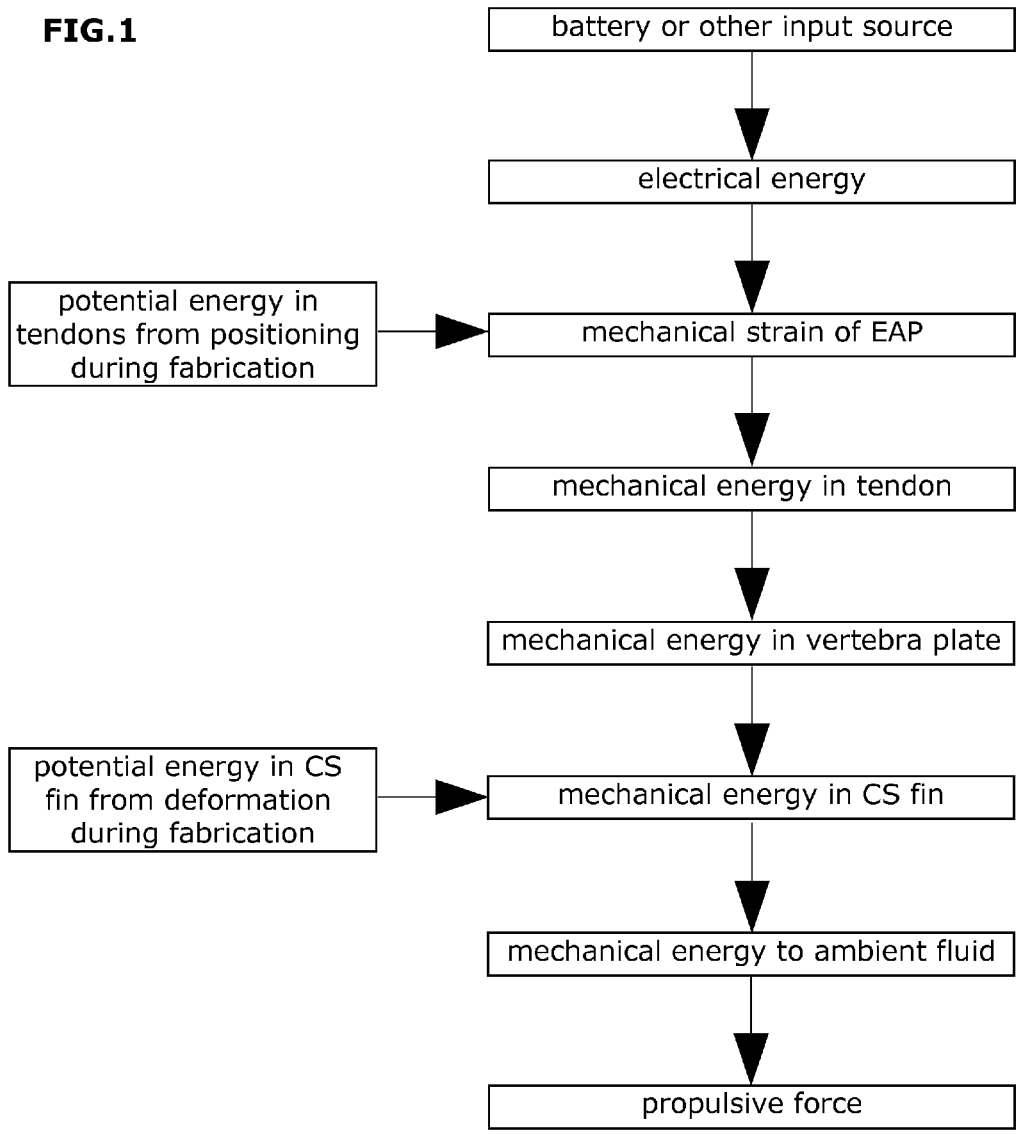
FIG. 1 illustrates some aspects of a propulsion or actuation embodiment showing the flow of energy and forces through the mechanism.
Figure 2:
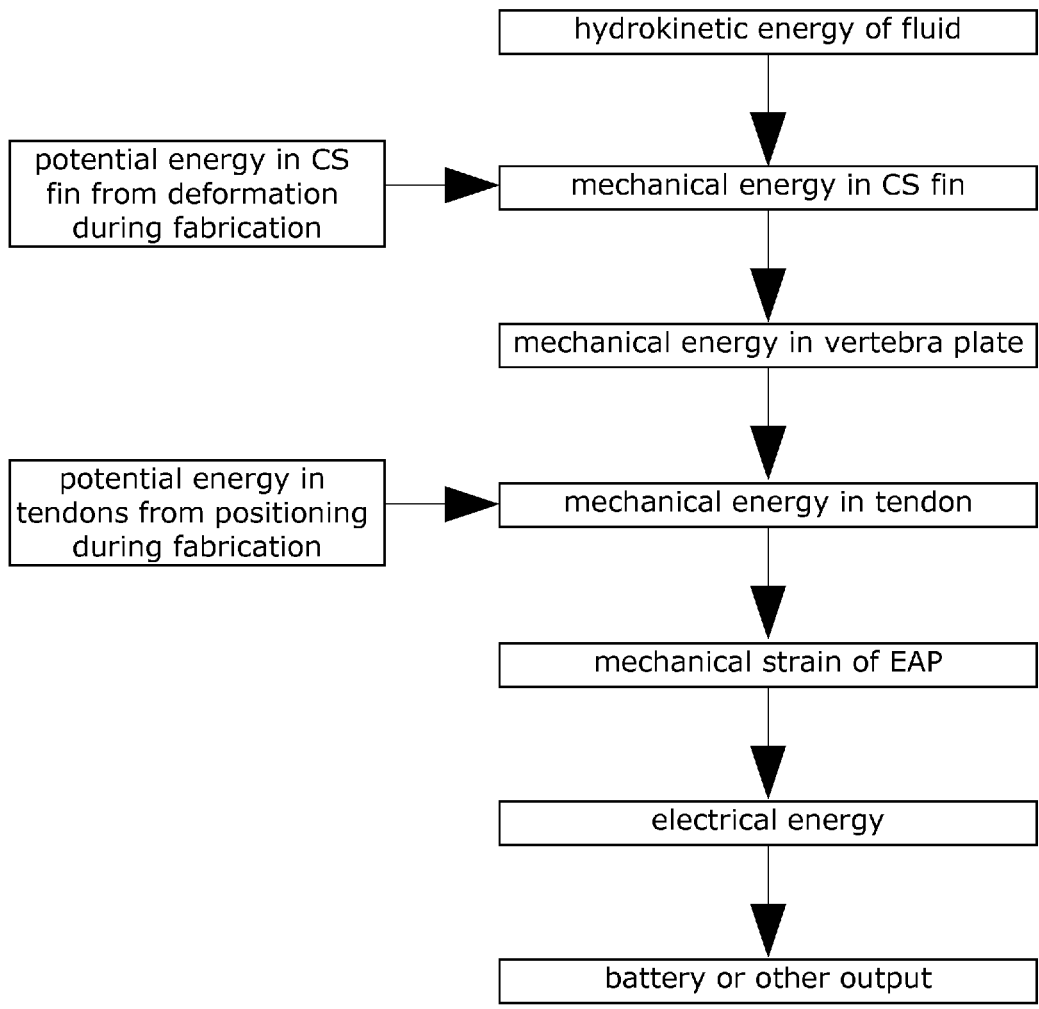
FIG. 2 illustrates some aspects of a generator embodiment showing the flow of energy through the mechanism.
Figure 3:
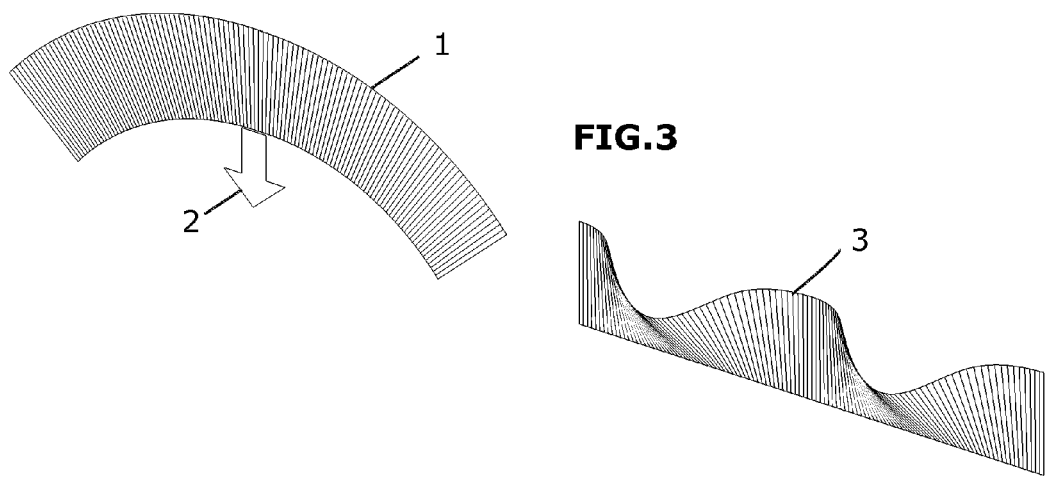
FIG. 3 illustrates the deformation of a sheet-like member to create a crenated strip in one embodiment.

In some embodiments, flexible sheet-like members 1 are deformed with at least one applied force 2 in such a manner as to create one or more deformations FIG. 3 to form a crenated strip 3. The deformation(s) of the crenated strip 3 may be maintained via one or more restraining components. In one embodiment, this restraining component is at least one vertebra plate 4 coupled in at least one location to the crenated strip 3. The restrained crenated strip is referred to as the crenated strip fin, or CS fin 5, FIG. 4.

Figure 4:
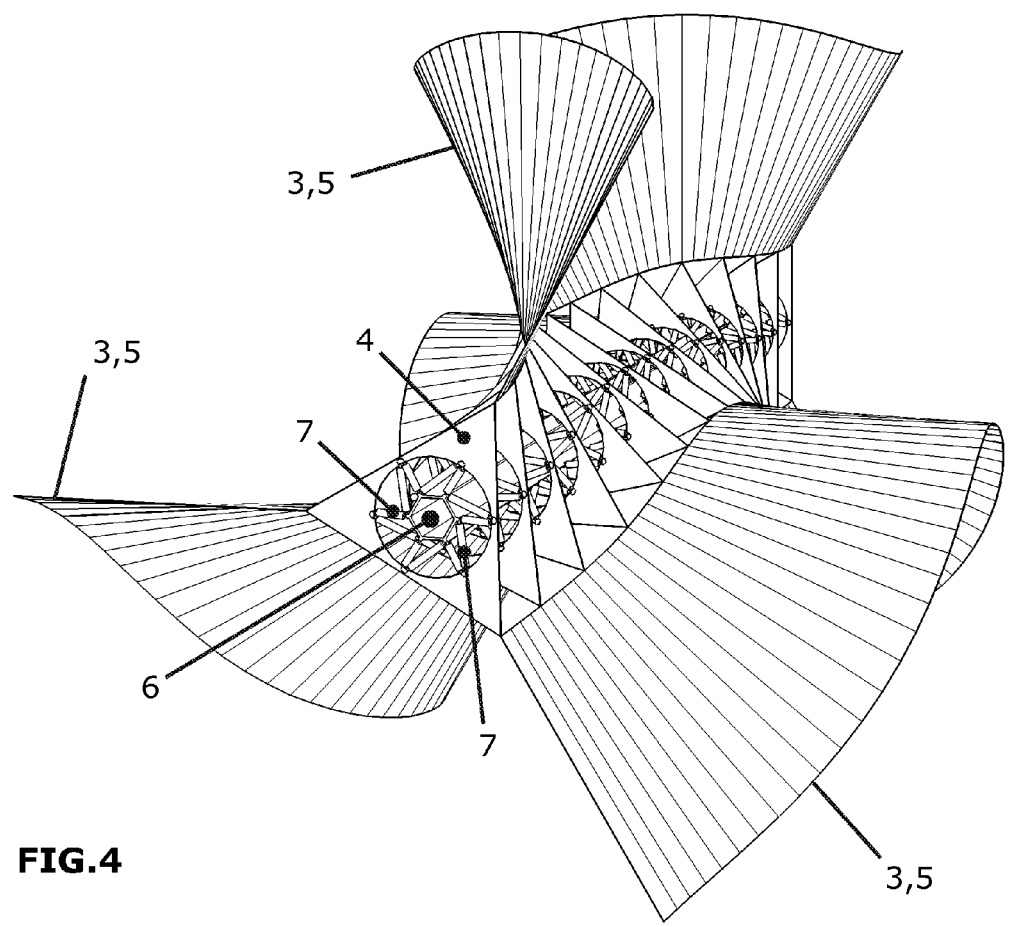
FIG. 4 illustrates some aspects of assembled components of an embodiment of the disclosed mechanisms.

The CS fin 5 may be coupled, in some implementations, to a rigid or semi rigid central member 6, such as via one or more variable length or elastic tendons 7. Directional forces between the tendon 7 and central member 6 are balanced by equal and opposite directional forces of at least one other tendon 7 and one other CS fin 5. FIG. 4.

Figure 5:
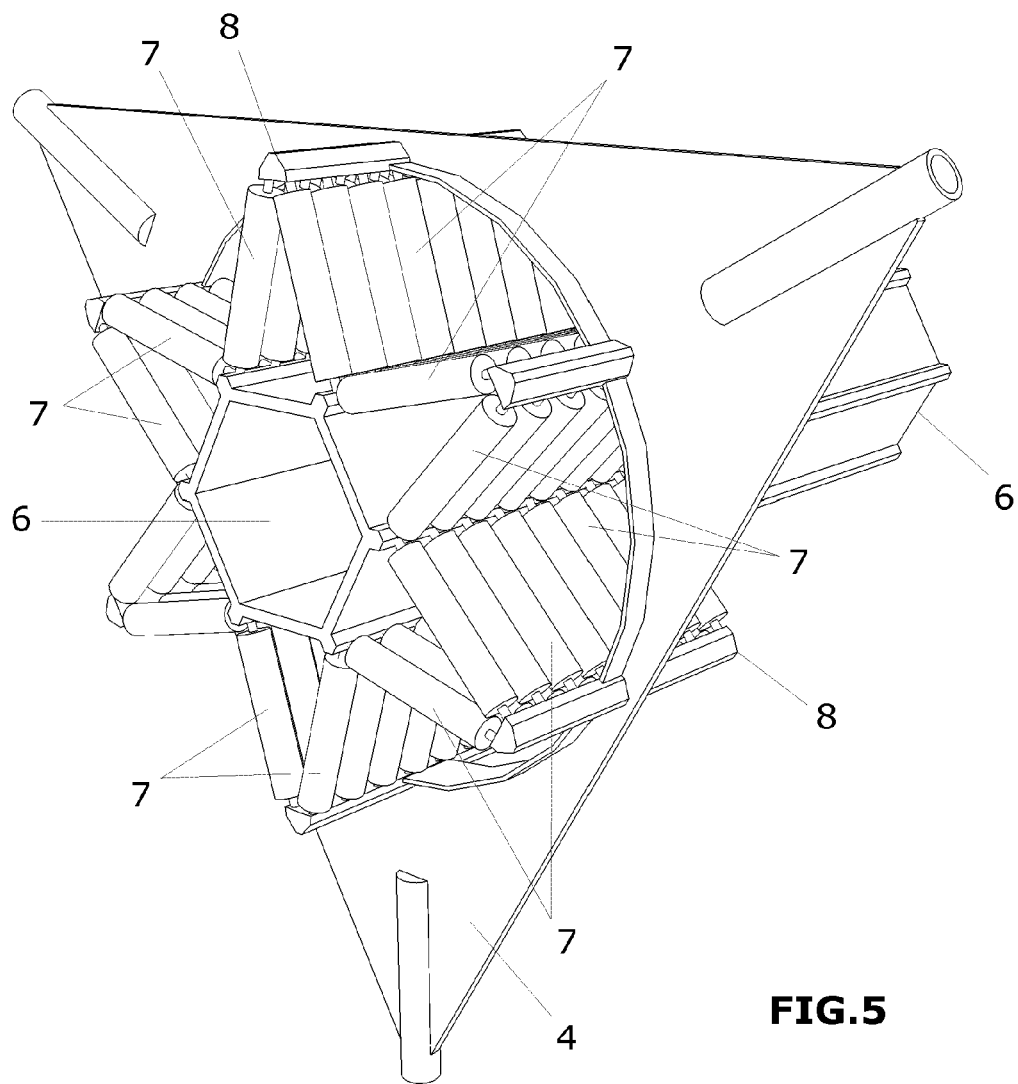
FIG. 5 illustrates some aspects of assembled components of an embodiment including vertebra plate 4, central member 6, tendons 7 and hanger bars 8.

FIG. 5 shows an embodiment of a single vertebra plate 4 with multiple tendons 7 attached to the central member 6 at one end, and attached to the vertebra plate 4 via a bar connector 8 at another other end. The configuration in FIG. 5 may work equally well for propulsion and generator embodiments.

For actuated embodiments, actuation of the tendons 7 will cause them to lengthen or shorten, thereby changing the internal energy state of the CS fins 5 and thereby causing the position of the deformation, or deformations, to shift position. In shifting position relative to an ambient fluid, the deformations of the CS fins 5 may impart forces onto the ambient fluid to create a propulsive effect in some embodiments. In one embodiment, the tendons 7 may be comprised of rolled or stacked electroactive polymers, a class of materials which may contract when an electric charge is applied via electrodes. Electrical energy from a power source is converted to mechanical strain in electroactive polymer tendons 7. Adding charge to or removing charge from an electroactive polymer tendon 7 may cause the length of the tendon 7 to change. Therefore, by controlling charge to the tendons 7, the relative lengths of the tendons may be controlled. As their lengths change, the forces they impart to the CS fins 5 change and therefore the internal energy states of the CS fins 5 change, causing the positions of the deformations to change.

For generator embodiments of the invention, forces 14 from ambient moving fluid may cause the deformations of the CS fins 5 to shift in position, imparting force onto the tendons 7. This force on the tendons 7 may cause them to lengthen or shorten in some implementations. In one embodiment, the tendons 7 are comprised of electroactive polymers, which may convert mechanical energy into electrical energy through material strain and may convert electrical energy into mechanical strain, FIGS. 8-14

Figure 6:
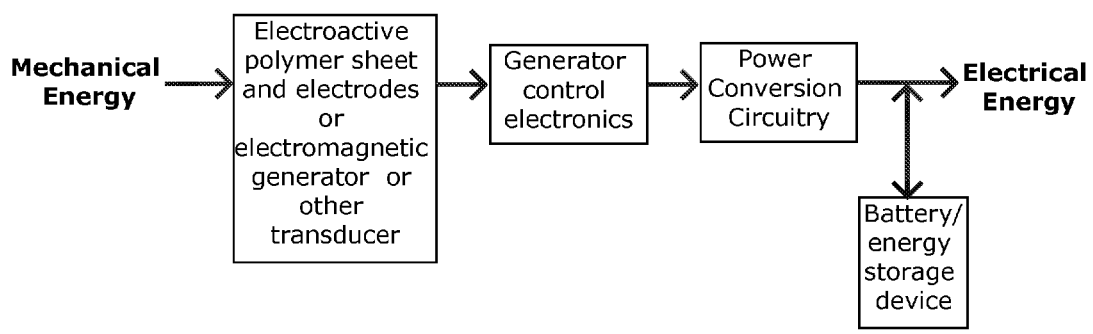
FIG. 6 illustrates some aspects of power conversion for a generator in one embodiment.
Figure 7:
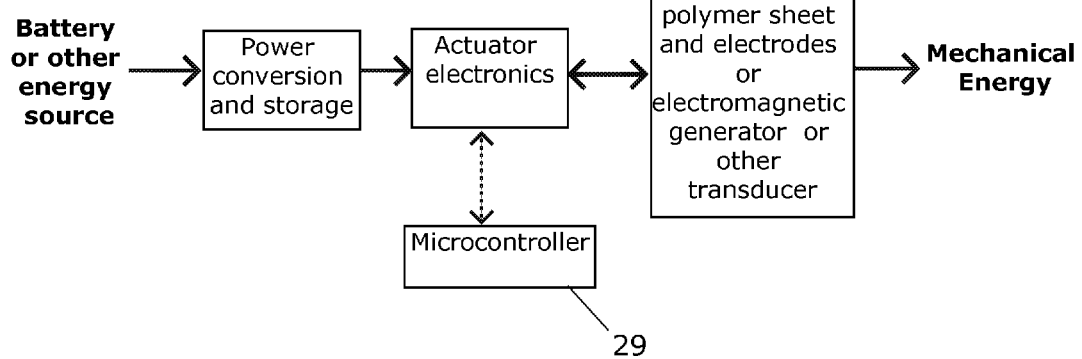
FIG. 7 illustrates some aspects of power conversion for an actuator in one embodiment.
Figure 8:
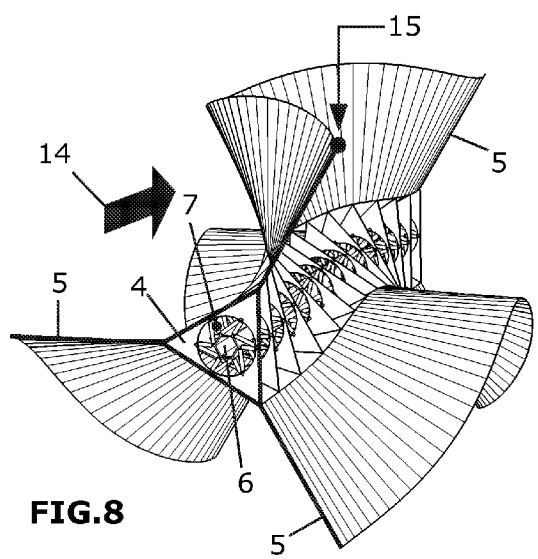
FIGS. 8-11 illustrate some aspects of four sequential states under operation of a generator in one embodiment.
Figure 9:
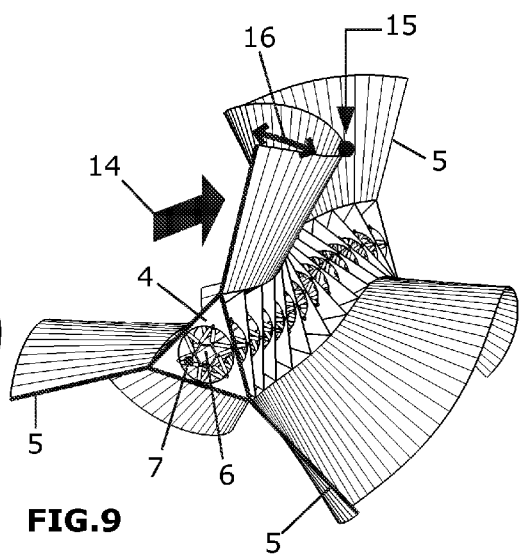
Figure 10:
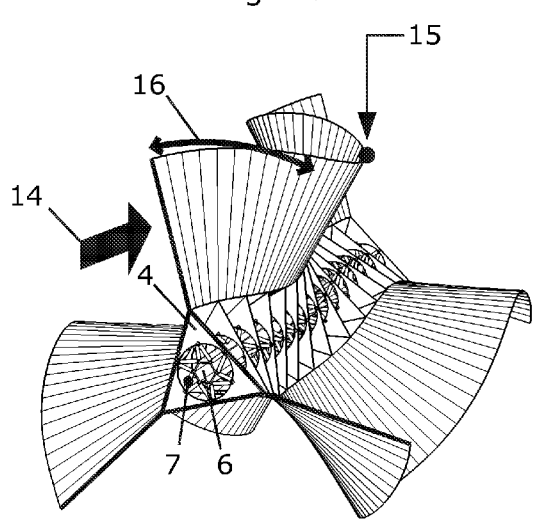
Figure 11:
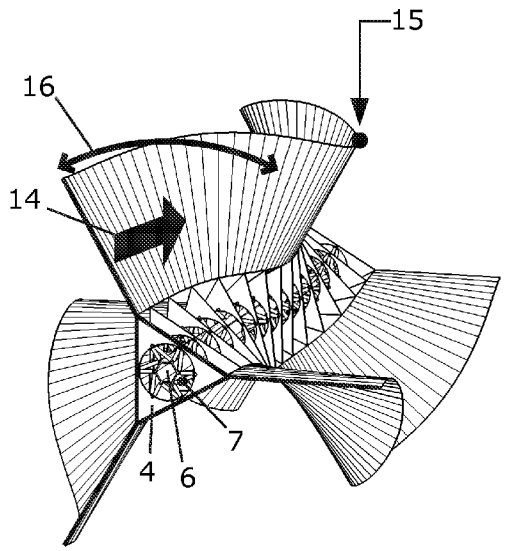

For generator embodiments, mechanical energy may act upon an electroactive polymer sheet with electrodes, and/or other type of transducer. In some implementations, electrical energy from the transducer passes through generator control electronics and then to power conversion circuitry, and then to an electrical output or storage device. FIG. 6. For actuator embodiments, energy from a battery or other energy source may pass through a converter and then through actuator electronics, then to electroactive polymer material via electrodes, and/or to some other transducer, which converts electrical energy into mechanical energy. FIG. 7.

FIGS. 8-11 show aspects of a sequence under operation and forces of moving water 14, showing how in one generator embodiment, the travel of deformations along a CS fin 5 correlates with rotation of vertebra plates 4 which in turn changes the length of the tendons 7 via which the CS 5 fins are coupled to the central member 6. The deformations can, in one implementation, be thought of as protruding from either side of a neutral axis and causing partial rotation clockwise or counter clockwise. FIGS. 8-11 track a single point 15 on a CS fin 5 as defined by maximum deformation and maximum rotation. The relative rotation 16 of a vertebra plate 4 may correlate with the movement of a single point 15 of deformation along the CS fin 5.

Figure 12:
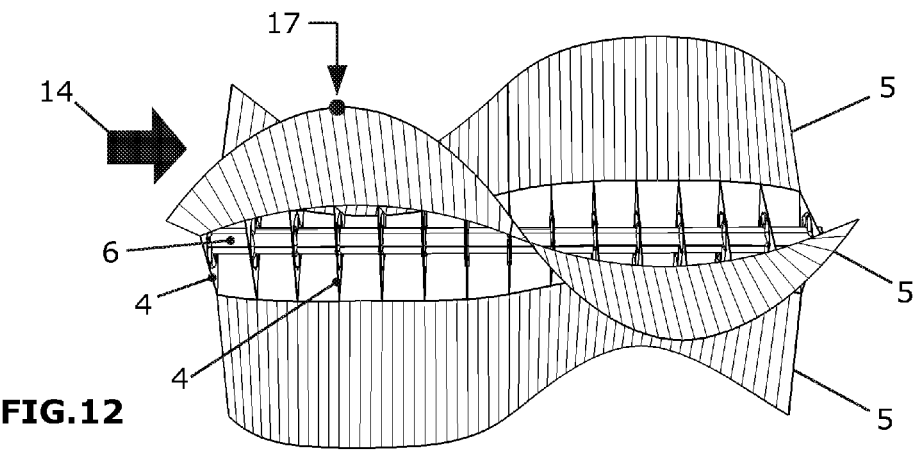
FIGS. 12-14 illustrate some aspects of three sequential states under operation of the embodiment shown in FIGS. 8-11 viewed from the top or side.
Figure 13:
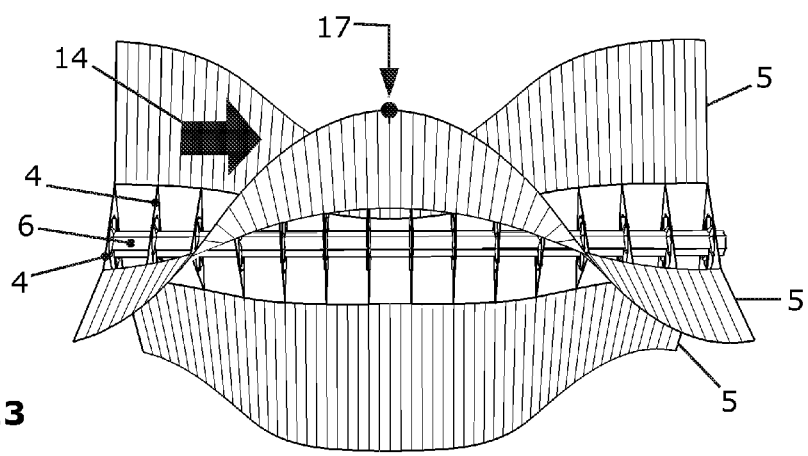
Figure 14:
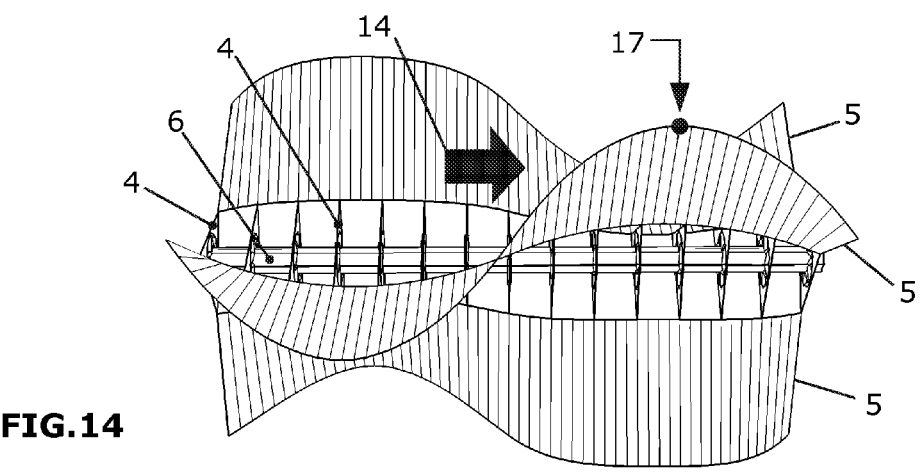
Figures 15, 16:
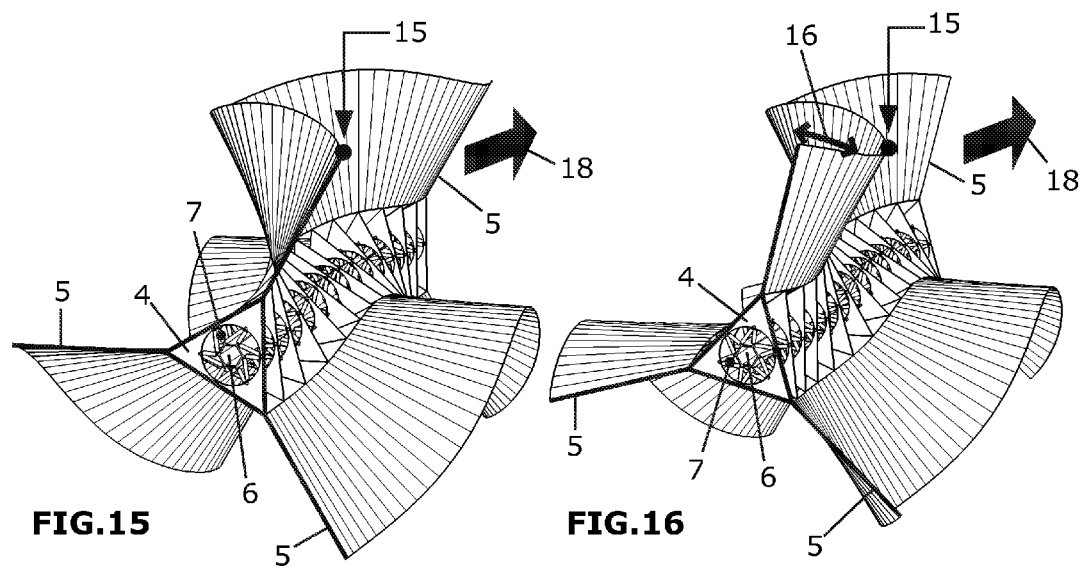
FIGS. 15-18 illustrate some aspects of four sequential states under operation of an actuator embodiment.
Figures 17, 18:
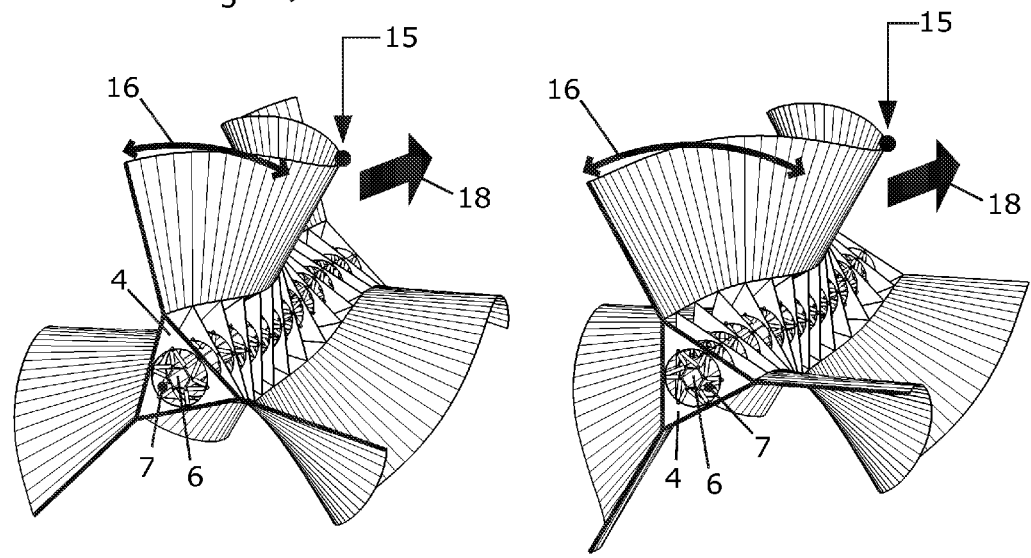

FIGS. 12-14 show aspects of a sequence under operation of a generator embodiment showing a top view of the embodiment shown in FIGS. 8-11, and tracks the travel of a single point 17 on one CS fin 5 at maximum wave amplitude, or rotation, as deformations travel along the CS fin 5 imparting rotation to the vertebra plates 4.

FIGS. 15-18 show aspects of a sequence under operation of an actuated propulsion embodiment, showing how, in one implementation, actuated tendons 7 may sequentially rotate vertebra plates 4 which impart force onto the CS fins 5 to create a propulsive force 18. FIGS. 15-18 track a single point 15 on a CS fin 5 as defined by maximum deformation and maximum rotation. The relative rotation 16 of a vertebra plate 4 may correlate with the movement of a single point 15 of deformation along the CS fin 5.

Figure 19:
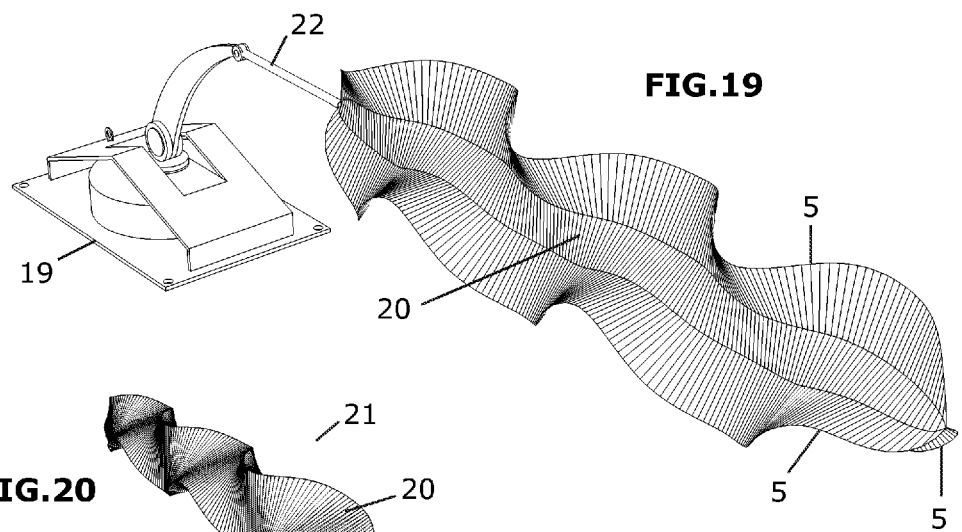
FIG. 19 illustrates some aspects of a generator embodiment with one implementation of an anchoring mechanism.

FIG. 19 shows some aspects of a generator embodiment attached to one implementation of an anchoring mechanism 19 that will hold the mechanism still in a fluid stream. In the illustrated embodiment, flexible longitudinal strips 20 enclose the vertebra plates and tendons in a longitudinal enclosure 21. For hydropower embodiments, the longitudinal strips 20 may provide a waterproof enclosure 21, FIG. 20, such as to keep electronic components dry. This waterproofing may not be a requirement for wind power embodiments. The electronic components enclosed within the longitudinal enclosure 21 may include electroactive polymer tendons, wiring, printed circuit boards, and/or the like components. In one implementation, electronic components may be housed in the anchoring mechanism 19 and connected to the generator core by a conduit 22.

Figure 20:
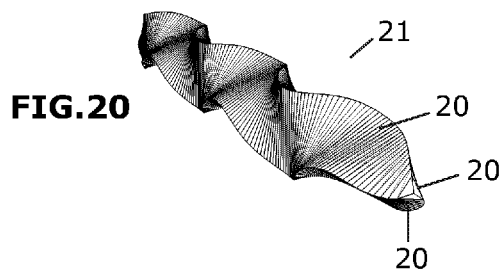
FIG. 20 illustrates some aspects the longitudinal enclosure 21 of an embodiment.
Figure 21:
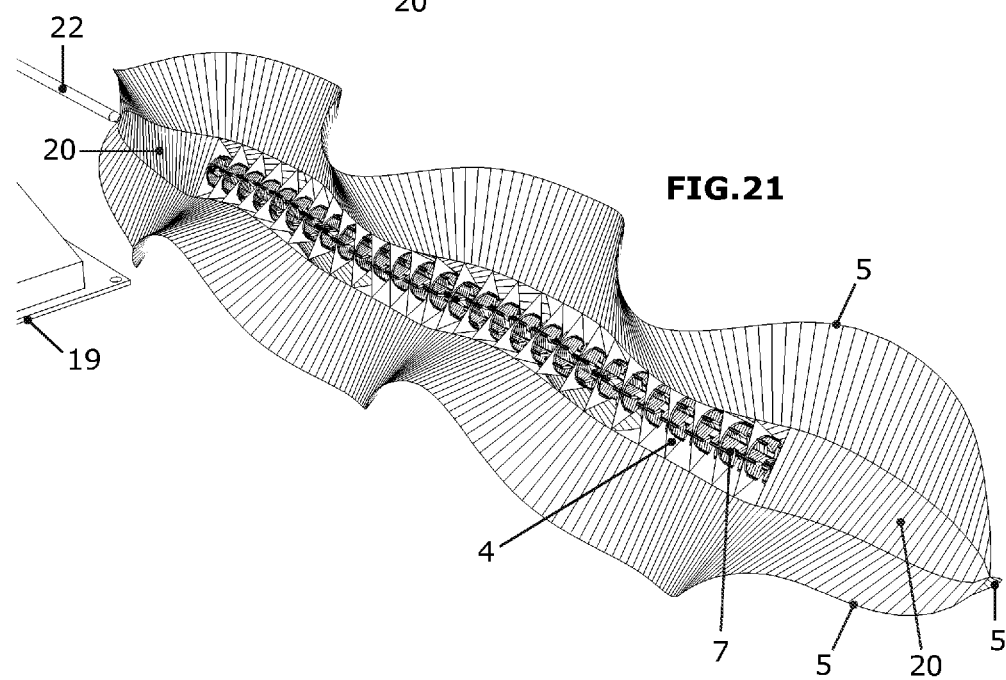
FIG. 21 illustrates some aspects of the embodiment of FIG. 19 with the longitudinal strips 20 removed.

FIG. 21 shows some aspects of the generator embodiment of FIG. 20 without the longitudinal strips 20 to reveal the vertebra plates 4 and tendons 7 inside.

Figure 22:
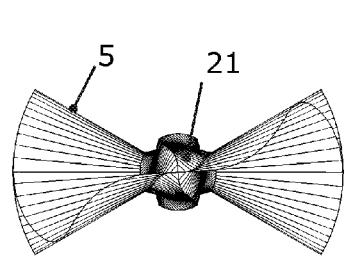
FIGS. 22-24 illustrate some aspects of two, three and four-finned architectures in different embodiments.
Figure 23:
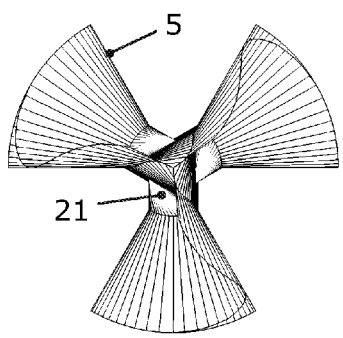
Figure 24:
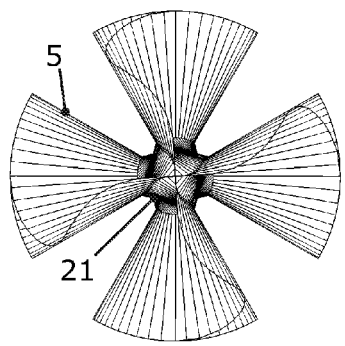
Figure 25:
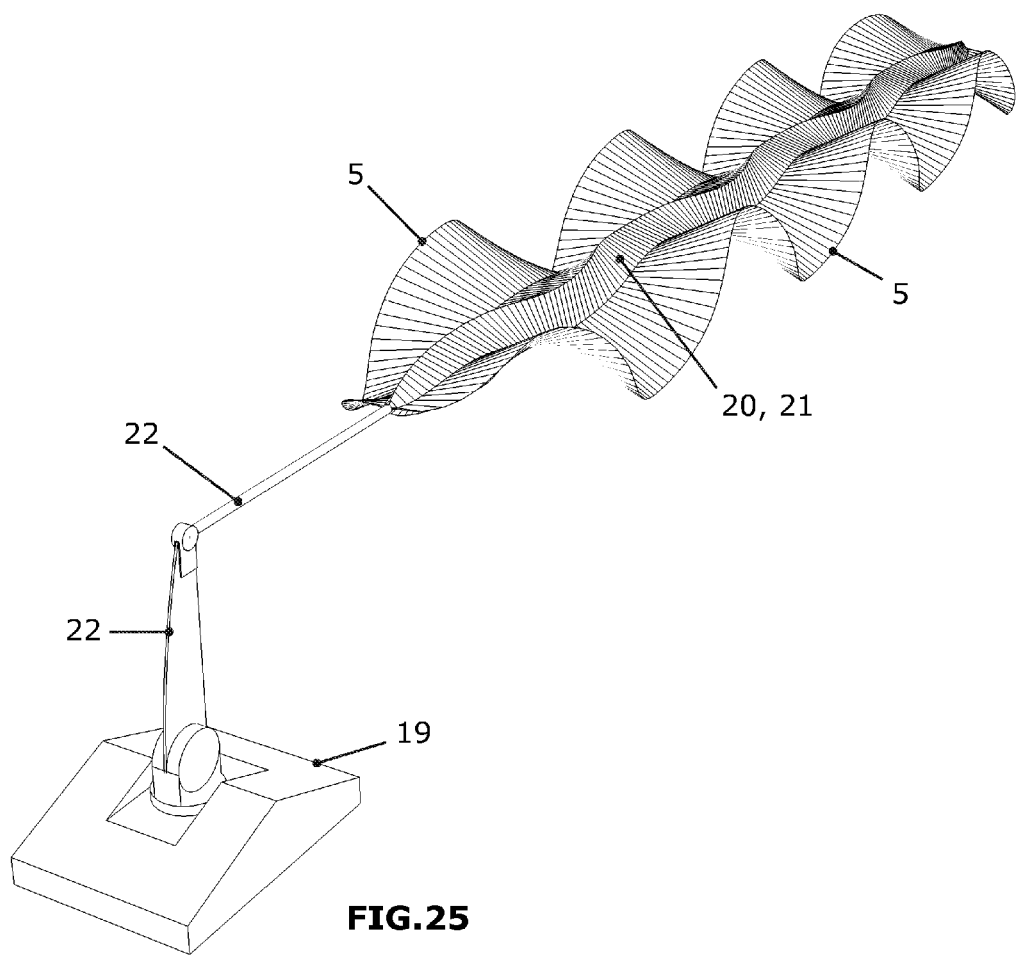
FIG. 25 illustrates some aspects of a 2-finned generator embodiment with one implementation of an anchoring system.

The number of CS fins 5 may vary in different embodiments for both propulsion and generation, FIGS. 22-24. FIG. 25 shows a generator embodiment with 2 CS fins.

In yet another embodiment of the present invention FIG. 26, the CS fins 5 may be eliminated and the longitudinal strips 20 are the external surface primarily interacting with the fluid instead. In such embodiments without the CS fins 5, the vertebra plates 4 may be widened FIG. 28. During fabrication, forces may be applied to the longitudinal strips 20 in their relaxed state to create deformations in the longitudinal strips 20. The vertebra plates 4 may be coupled to the longitudinal strips 20 and elastically or variably coupled to the central member 6 via tendons 7 in some implementations. The longitudinal strips 20 are unable to return to their pre-deformed shape after being restrained via attachment to the vertebra plates 4. Therefore, undulations in the longitudinal strips 20 persist and undulations, such as traveling undulations, are expressed as partial rotation of the vertebra plates 4 clockwise and counterclockwise.

Rotation of the vertebra plates causes the lengths of the tendons 7 to change. FIGS. 29-33 illustrate aspects of a vertebra plate 4 undergoing a sequence of clockwise rotations and show how the tendons 7 change length with rotation in one implementation. FIGS. 34-38 illustrate further detail from the same sequence with the vertebra plate 4 removed from view but with rings 23 that couple the vertebra plates to the tendons remaining visible.

Several of these embodiments may be attached to a vessel to propel the vessel through fluid. In one implementation, one device is attached to the vessel, and in alternative embodiments, multiple devices may be attached. The device may be attached to the vessel by, for example, connecting the central core member to the vessel. This connection may be made with screws, glue, gusset plates, or other connecting mechanism. Alternate means of connection may also be implemented.

FIG. 27 illustrates an example of a free-swimming propulsion embodiment 25.

Figure 39:
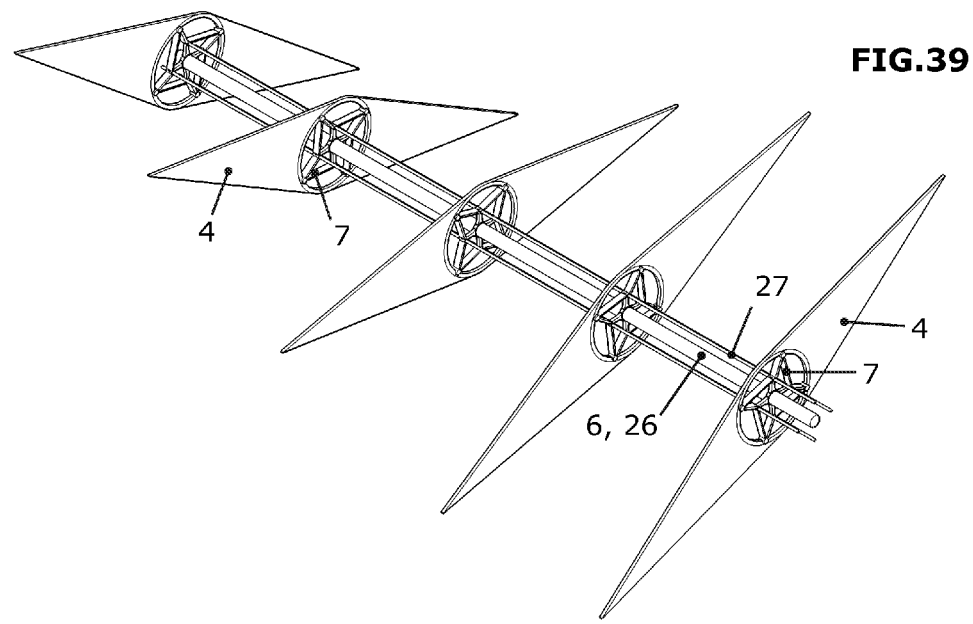
FIG. 39 illustrates some aspects of another embodiment with strips 20 removed to show vertebra plates 4, tendons 7 and flexible central member 26.
Figure 40:
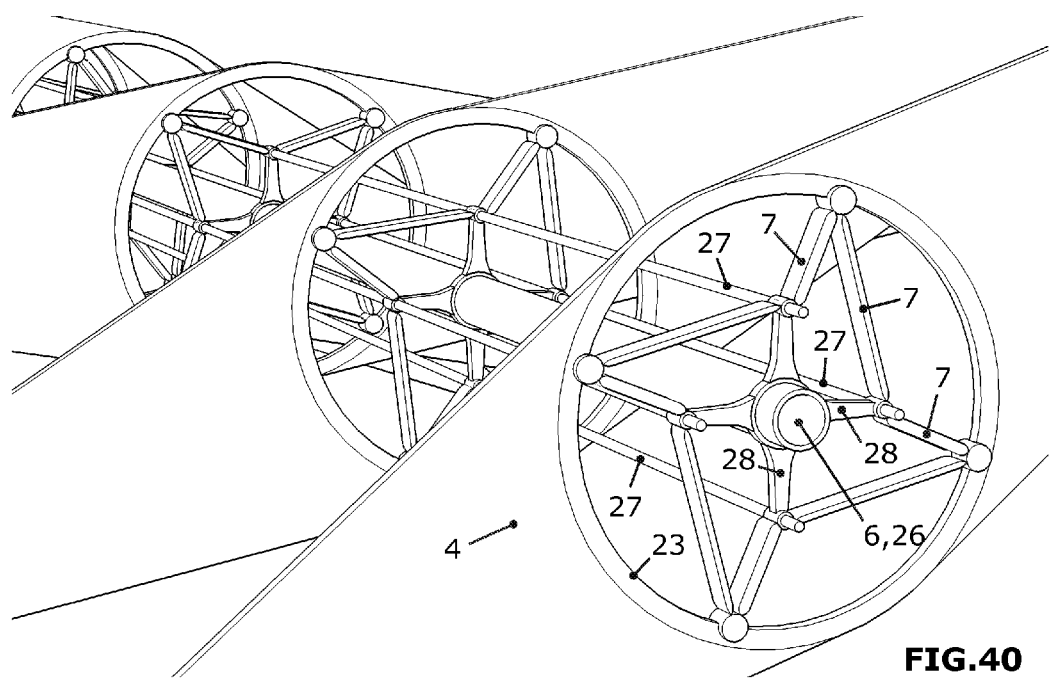
FIG. 40 illustrates some aspects of the embodiment of FIG. 39 from a closer view.

In yet another implementation of the propulsion embodiment, the central member 26 is flexible and may be induced to bend in any direction via one or more actuated longitudinal tendons 27 which connect to each other end-to-end forming one or more rows of longitudinal tendon 27 lines that run parallel to the flexible central member 26, FIGS. 39-40. Actuation of the longitudinal tendons 27 causes them to change in length. This change in length may occur by applying and releasing voltage, current, pressure, a magnetic field and/or the like. Three or more rows of longitudinal tendons 27 allow control of direction of movement of a free-swimming propulsion mechanism 25. The longitudinal tendons 27 are fixed to the flexible central member 26, such as by radial arms 28 and may be arranged relative to the flexible central member 26 so that one line is above and one line is below the flexible central member 26, and one line is to one side of the flexible central member 26, and one line is to the other side of the flexible central member 26, such as in a cross-shaped pattern. Reducing the length of only the upper line of longitudinal tendons 27 will cause the central axis of the mechanism to curve upward. Reducing the length of only the lower line of longitudinal tendons 27 will cause the central axis of the mechanism to curve downwards. In the same way, reducing the length of the line of longitudinal tendons 27 on only one side causes the central axis of the mechanism to curve towards that side, and the mechanism will veer in that direction.

In one implementation, each line of longitudinal tendons 27 may be supplied with an actuation circuit and a sensor circuit connected electronically to a microcontroller 29, which may control the length of each via actuation of the line of longitudinal tendons 27. In this manner, the microcontroller may cause the direction of travel of the vessel to change by causing the longitudinal central axis of the mechanism to curve, causing the vessel to alter its course from a straight trajectory to a curved trajectory. The longitudinal tendons 27 may be comprised of a number of different materials, such as electroactive polymers, shape memory alloys, carbon nanotubes, and/or any other of a variety of existing and emerging materials in which the material will change shape when actuated by electric charge, heat and/or other input. In addition, these actuated components described above may be actuated pneumatically or hydraulically using assemblies of components such as pumps and valves coupled to such final actuators as pistons, diaphragms and/or other actuators. Methods by which such components may be induced to change the shape and/or length may be applied, so that the arrangements described above will produce the desired actions described above, whichever materials/components are used.

Figure 41:
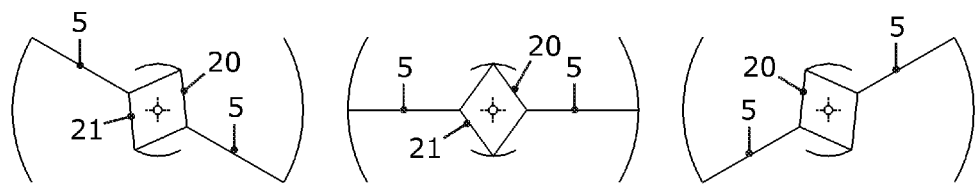
FIG. 41 illustrates certain aspects of three positions of motion for a partially rotating embodiment.
Figure 42:
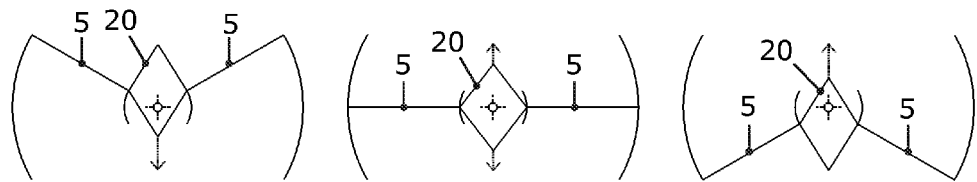
FIG. 42 illustrates certain aspects of three position of motion for a bilateral reciprocating embodiment.
Figure 43:
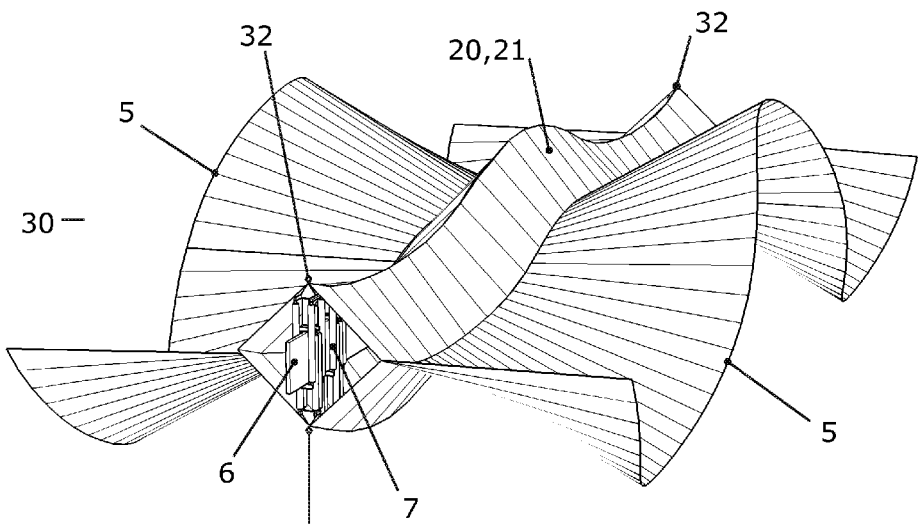
FIG. 43 illustrates some aspects of a bilateral reciprocating embodiment.

Some of the propulsion and generator embodiments disclosed thus far have utilized rotary reciprocating motion of the vertebral plates, with the CS fins 5 coupled to the vertebra plates 4 so that the CS fins 5 undulate substantially in-phase with each other FIG. 41. The longitudinal strips 20 also undulate substantially in-phase with each other in such embodiments. In another implementation, the CS fins 5 may rotate in substantially opposite directions relative to each other to create a bilateral reciprocating action FIG. 42.

Bilateral reciprocator 30 embodiments may be configured with a central member 6 coupled on opposite sides by tendons 7 that, as with embodiments utilizing rotational motion, may be actuators for propulsion embodiments or energy harnessing components for generator embodiments. The forces within the deformations of the CS fins 5 are transferred first to the longitudinal strips 20 and then onto the tendons 7 and then onto the central member 6. Each tendon 7 may, in one implementation, be coupled at one end to the central member 6, such as via a tension bracket 31, and may be coupled at the other end to the junction point 32 of two longitudinal strips 20, such as via a tension hanger bracket 33, FIGS. 43-47.

Figure 44:
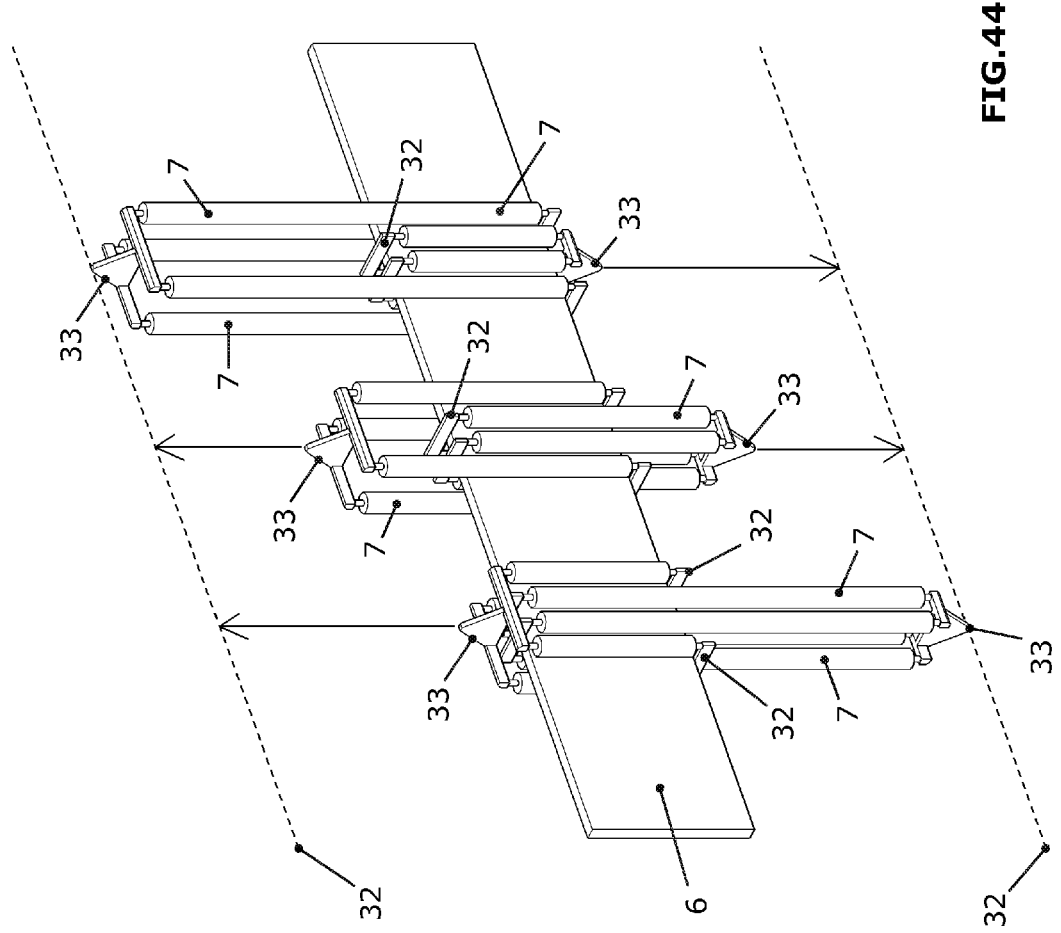
FIG. 44 illustrates some aspects of assembled detail of a bilateral reciprocating embodiment.

FIG. 44 illustrates some aspects of assembled details of a bilateral reciprocating embodiment.

FIG. 45 illustrates some aspects of a bilateral reciprocating embodiment with its longitudinal strips 20 removed.

FIG. 46 illustrates some aspects of a bilateral reciprocating embodiment with its CS fins 5 removed.

FIG. 47 illustrates some aspects of a bilateral reciprocating embodiment of FIG. 46 with its CS fins 5 removed and its longitudinal strips 20 removed.

Actuator embodiments of the bilateral reciprocator 30 utilizing electroactive polymers may be employed to address the challenge of electroactive polymer actuation in which tension force is desired: The potential energy stored in the CS fins during the fabrication process from the force 2 used to create the persistent deformations of the crenated strips 3 that forms the CS fins 5, is redistributed within the CS fin 5 when charge is selectively applied to tendons 7. Therefore, rather than actuation of a tendon 7 causing it to contract and exert propulsive force onto the CS fin 5, actuation of a tendon causes it to elongate, which causes deformations to shift via the elastic forces loaded as potential energy during fabrication.

Described another way, the tendons of propulsion embodiment are not actuated to exert tensile force. The tensile forces in the entire mechanism are present due to deformation forces during fabrication. Actuation of tendons may cause them to relax, thus changing the balance of forces and causing the stored potential energy to release, thereby initiating motion in the tendons 7 and therefore also in the CS fins 5.

Some actuator and generator embodiments may also be described as follows:

Two or more crenated strips 3 or deformed members 3 elastically coupled to a rigid or semi rigid central member 6 via tendons 7 so that the deformation energy of one deformed member 3 is shared with every other deformed member 3 in dynamic equilibrium.

A rigid or semi rigid central member 6 symmetrically coupled via tendons 7 to at least two deformed members 3 with the potential energy of the deformations in the deformed members 3 held in equilibrium by the transfer of forces between the deformed members 3 via the tendons 7.

A central rigid or semi-rigid member 6 elastically coupled via tendons 7 to at least two deformed members 3 whose internal energy states communicate via the tendons 7 and rigid or semi-rigid member 6 so that the internal energy states of the deformed members 3 are in equilibrium.

Energy from an external source such as the kinetic energy of moving water or air causes the deformations of the deformed members 3 to shift and in so doing impart energy onto the tendons 7 from which energy may be harnessed. An input of energy into the tendons 7 causing them to expand or contract imparts forces onto the deformed members 3 causing the deformations therein to shift and thereby imparting force onto ambient fluid such as air or water to create a propulsive effect.

This disclosure describes inventive aspects, including at least the following:

It is to be understood that the tendons 7 of propulsion and generator embodiments may be configured as transducers and may be comprised of a number of different components. Embodiments discussed herein are directed to novel mechanical components and their novel assembly which effectively transfer forces to the tendon 7 transducers, or transfer forces away from the tendon 7 transducers. Therefore, this invention may couple with other components not described explicitly. Examples include adaptations whereby the tendons 7 are pneumatic tubes or pistons which may pump a fluid for the purpose of pumping, and/or to drive a conventional electromagnetic generator.

It is to be understood that while the embodiments discussed herein focus on examples utilizing electroactive polymer materials for the tendons 7, the mechanical principles brought to bear work equally well for embodiments in which the tendons 7 may be any elastic or variable length transducer. Embodiments discussed herein are directed to the design, arrangement and functioning of mechanical components acting upon tendons 7, which are transducers for propulsion or energy harnessing.

The deformed member 3 or CS 5 fins described herein may also, in some implementations, be comprised of a segmented sheet-like material, such as one having portions which are stiffer coupled to each other by portions or joints which are less stiff.

FIG. 48 illustrates some aspects of a generator embodiment in which the transducer of at least one vertebra is an electromagnetic generator 34 rotationally coupled to the vertebra plate 4 and fixed to the central member 6. Traveling undulations of the CS fins 5 cause rotational movement of the vertebra plates 4 as described above, generating electricity in the ring generators 34 which may be fixed in position relative to the central member 6.

FIG. 48 also illustrates some aspects of a propulsion embodiment in which the transducer of at least one vertebra is an electric motor 35 rotationally coupled to the vertebra plate 4 and fixed to the central member 6. Actuation of the electric motor 35 causes the vertebra plates 4 to rotate which imparts force to the CS fins 5 which impart force onto ambient fluid Some propulsion embodiments may also be described as follows:

Two or more deformed flexible members 3 symmetrically coupled to a fixed central member 6 so that the potential energy in the deformations of each flexible member 3 are in equilibrium with the potential energy in the deformations of every other flexible member 3, and where the coupling mechanism is a transducer, and whereby an external energy source 14 causes the distribution of potential energy in the flexible members 3 to change and transfer energy to the transducers which harness the transferred energy. The transducer may be electroactive polymers, electromagnetic generator, etc.

Two or more deformed flexible members 3 symmetrically coupled to a fixed central member 6 so that the potential energy in the deformations of each flexible member 6 are in equilibrium with the potential energy in the deformations of every other flexible member 6, and where the coupling mechanism is a transducer, and where actuation of the transducer imparts force onto the flexible members 3 causing the distribution of potential energy in the deformed flexible members 3 to change and to transfer force onto the deformed flexible members 3 thereby creating a propulsive action 18. The transducer may be electroactive polymers, electromagnetic motor, etc.

Figure 49:
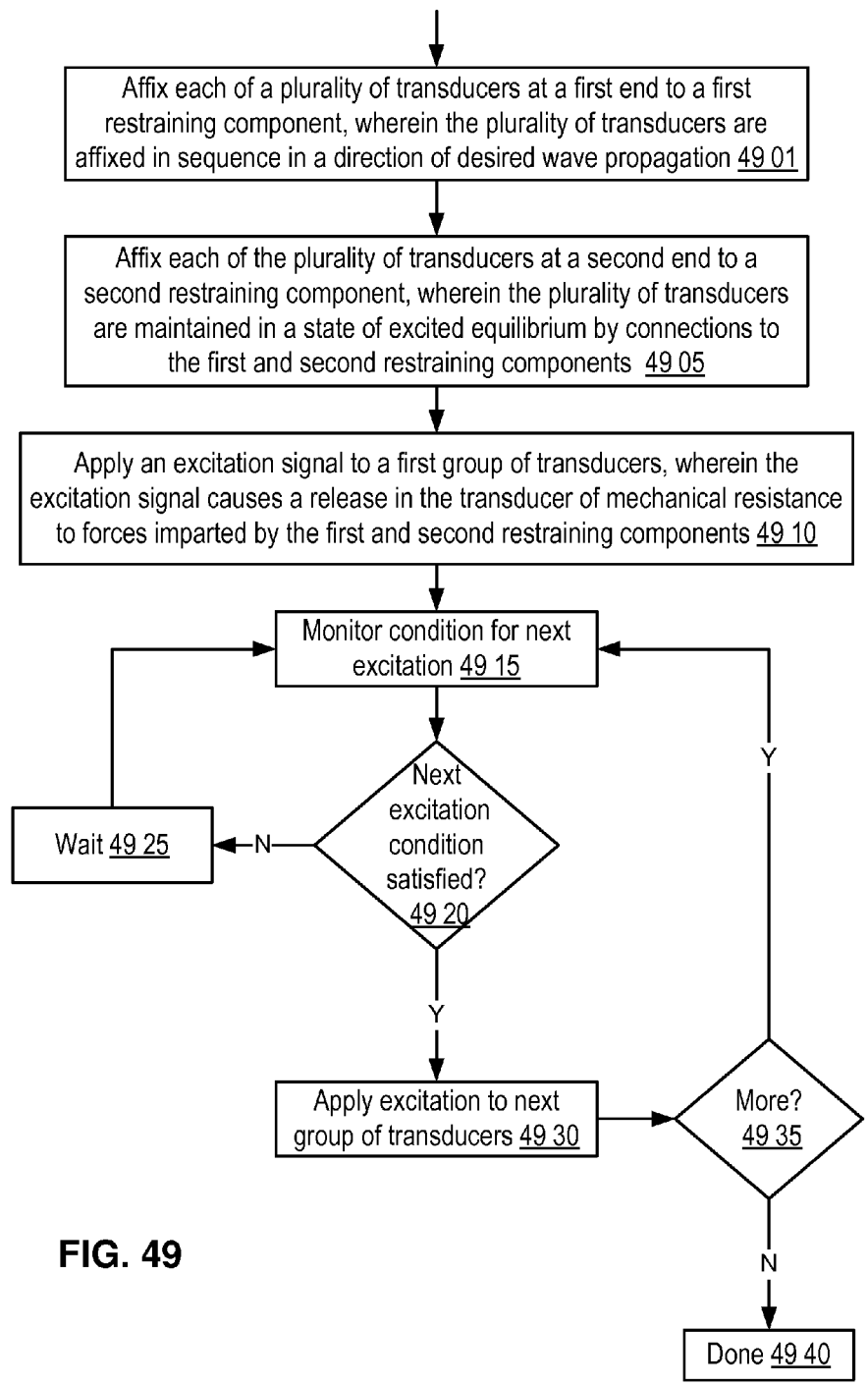
FIG. 49 illustrates a logic flow diagram showing an embodiment of transducer excitation.

FIG. 49 shows an exemplary embodiment of transducer excitation. A plurality of transducers may be affixed in sequence in a direction of desired wave propagation, wherein the plurality of transducers are each affixed at a first end to a first restraining component 4901. The second end of the plurality of transducers may be affixed to a second restraining component, wherein the plurality of transducers are maintained in ma state of excited equilibrium by connections to the first and second restraining components 4905. In some embodiments, the maintained state of excited equilibrium may be caused by an elongation of tendons, an applied pressure, and/or the like. An excitation signal may be applied to a first group of transducers, wherein the excitation signal causes a release in the transducer of mechanical resistance to forces imparted by the first and second restraining components 4910. The excitation signal may, in various embodiments, be a voltage, current, pressure, magnetic field, and/or the like. In some implementations, the strength of the excitation signal may be determined based on, for example, wave length, wave speed, wave frequency, historical values, sensor data wherein the sensors may track factors such as stress or displacement, and/or the like. Conditions may be monitored via a processor, CPU, microcontroller, and/or the like to determine the next excitation 4915 and a determination of whether the next excitation condition is satisfied 4920. The processor, CPU, microcontroller, etc., may also determine how much, where, and when excitation should be applied. The conditions may be based on, for example, whether sensor data such as a force or displacement exceeds or drops below a certain value. For example, the sensors may measure force in the tendons or displacement in the CS fins relative to a certain threshold. In an alternative embodiment, the condition may be based on a set passage of time and/or a model that indicates a signal should be sent to a certain part at a certain time. For example, in some implementations, sequence programming in the memory or data structures may include time, place, and the amount and/or type of excitation to apply as it relates to the propagation of a wave. If the condition is not met, the system may wait for a predetermined period of time 4925 or, in an alternative embodiment, continually loop to monitor for the next excitation 4915. When the next excitation condition is satisfied 4920, an excitation may be applied to the next group of transducers 4930. In some embodiments, as the wave propagates, the amount of excitation applied may decrease; that is, as motion propagates through the CS fins, the tendons may require less excitation. In some implementations, sensors may measure a restraining force, which may then be compared to a threshold value to determine the amount of excitation to apply. Further embodiments may show that when the excitation occurs in one group of transducers, the force on the second group of transducers is increased. In alternative embodiments, the force on the second group of transducers may be decreased after excitation occurs in the first group of transducers. If there is another group of transducers 4935, the system may monitor for the condition for the next excitation 4915; if there are no more groups, the loop terminates 4940.

The invention claimed is:

1. An articulated apparatus, comprising:
 a central core member;
 a plurality of transducers
  wherein each of the plurality of transducers is connected at a first position to an outer surface of the central core member and at a second position to at least one of a plurality of flexible articles disposed in contact with a fluid,
  wherein each of the plurality of flexible articles has at least one contact surface permanently configured with at least one persistent deformation projecting transverse to a central axis of the central core member and maintained via at least one restraining component,
  wherein the at least one restraining component comprises a plurality of vertebra plates, and
  wherein undulations of the at least one persistent deformation correspond to excitations of the plurality of transducers.

2. The apparatus of claim 1, wherein each transducer is connected at the second position to the at least one of the plurality of flexible articles via one of the plurality of vertebra plates.

3. The apparatus of claim 2, further comprising:
 a plurality of flexible strips, wherein each of the plurality of flexible strips attaches corresponding edges of the plurality of vertebra plates together, and
 wherein the plurality of flexible strips form an enclosed volume containing the plurality of vertebra plates, the plurality of transducers, and the central core member.

4. The apparatus of claim 1, wherein each transducer is comprised of electroactive material.

5. The apparatus of claim 4, wherein the electroactive material is an electroactive polymer.

6. The apparatus of claim 4, further comprising:
 a generator control circuit coupled to the plurality of transducers,
  wherein undulations of the persistent deformations are induced by flowing of the fluid, and
  wherein the undulations of the persistent deformations induce the excitations in the plurality of transducers to drive the generator control circuit.

7. The apparatus of claim 6, further comprising:
 a power conversion circuit coupled to the generator control circuit to receive power therefrom; and
 an energy storage device coupled to the power conversion circuit and configured to store energy received from the power conversion circuit.

8. The apparatus of claim 4, further comprising:
 an actuation circuit coupled to the plurality of transducers,
  wherein the excitations in the plurality of transducers are driven by the actuation circuit, and
  wherein the excitations in the plurality of transducers induce the undulations of the at least one persistent deformations to drive the fluid in a direction substantially parallel to the axis of the central core member.

9. The apparatus of claim 8, wherein the central core member is flexible, and further comprising:
a plurality of longitudinal transducers, comprised of electroactive material, coupled to the central core member and the actuation circuit and oriented in a direction substantially parallel to the axis of the central core member;
a control circuit coupled to the actuation circuit and configured to selectively control tension and compression in members of the plurality of longitudinal transducers causing bending of the central core member.

10. The apparatus of claim 9, further comprising:
a sensor circuit coupled to the plurality of longitudinal transducers to detect the excitations, and coupled to the control circuit to affect selective control of the excitations of the plurality of longitudinal transducers.

11. The apparatus of claim 1, wherein the central core member is rigid.

12. The apparatus of claim 1, wherein each transducer comprises a pressure-controlled member.

13. The apparatus of claim 1, further comprising:
an anchor member connected at a first end of the central core member and fixed in position relative to the fluid.

14. The apparatus of claim 1, wherein the plurality of flexible articles are positioned symmetrically around the central core member.

15. The apparatus of claim 1, wherein at least two of the undulations of the persistent deformations are out of phase relative to each other.

16. The apparatus of claim 1, wherein at least two of the undulations of the persistent deformations are in phase relative to each other.

17. The apparatus of claim 1, wherein the plurality of transducers comprise:
a first group of transducers cycled through states of excitation substantially in phase with each other; and
a second group of transducers cycled through states of excitation substantially in phase with each other but out of phase with the first group of transducers.

18. The apparatus of claim 1, wherein the excitations in the plurality of transducers corresponds to rotational oscillations of the at least one restraining component about the central axis of the central core member.

19. The apparatus of claim 1, wherein the transducers are mechanical transducers.

20. The apparatus of claim 1, wherein the transducers are electromechanical transducers.

21. The apparatus of claim 1, wherein the excitations of the plurality of transducers occur by applying voltage to at least one of the plurality of transducers.

22. The apparatus of claim 1, wherein the excitations of the plurality of transducers occur by applying current to at least one of the plurality of transducers.

23. The apparatus of claim 1, wherein the excitations of the plurality of transducers occur by at least one of applying and releasing pressure to at least one of the plurality of transducers.

24. The apparatus of claim 1, wherein the excitations of the plurality of transducers occur by applying a magnetic field to at least one of the plurality of transducers.

25. The apparatus of claim 1 wherein the transducers are comprised of a magnetostrictive material.

26. The apparatus of claim 1, wherein the transducers are comprised of a metal coil passing through a magnetic field.

27. The apparatus of claim 1, wherein the transducers are comprised of hydraulic pistons.

28. The apparatus of claim 1, wherein the transducers are comprised of pneumatic pistons.

29. The apparatus of claim 1, wherein the transducers are comprised of shape memory alloy elements.

30. The apparatus of claim 1, wherein the plurality of flexible articles are crenated strip fins.

31. The apparatus of claim 1 wherein each of the plurality of transducers is linear and the first position is a first end and the second position is a second end.

32. The apparatus of claim 31 wherein the excitation of the transducers correspond to lengthening of the transducers.

33. The apparatus of claim 1 wherein connection at the first position is a fixed connection and connection at the second position is a rotational coupling.

34. The apparatus of claim 33 wherein each of the plurality of vertebra includes an aperture, and wherein the second position is at an edge of the aperture.

35. The apparatus of claim 1 wherein the central core member is attached to a vessel.

36. An articulated apparatus, comprising:
a flexible central core member;
a plurality of longitudinal transducers connected to an outer surface of the flexible central core member and oriented substantially parallel to an adjacent portion of the central axis of the flexible central core member,
wherein the plurality of longitudinal transducers are comprised of electroactive material;
a plurality of transverse transducers,
wherein each of the plurality of transducers is connected at a first end to the outer surface of the flexible central core member;
a plurality of flexible articles disposed in contact with a fluid,
wherein each of the plurality of flexible articles has at least one contact surface permanently configured with a persistent deformation projecting transverse to a central axis of the flexible central core member and maintained via at least one vertebra plate,
wherein each of the plurality of transducers is connected at a second end to at least one of the plurality of flexible articles via the at least one vertebra plate, and
wherein undulations of the persistent deformations correspond to excitations in the plurality of transducers;
an actuation circuit coupled to the plurality of transducers,
wherein the excitations in the plurality of transducers are driven by the actuation circuit, and
wherein the excitations in the plurality of transducers induce the undulations of the persistent deformations to drive the fluid in a direction substantially parallel to the axis of the central core member;
a control circuit coupled to the actuation circuit and configured to selectively control the excitations in members of the plurality of longitudinal transducers causing bending of the flexible central core member; and
a sensor circuit coupled to the plurality of longitudinal transducers to detect excitations, and coupled to the control circuit to affect selective control of the excitations of the plurality of longitudinal transducers.

37. An articulated apparatus, comprising:
a central core member;
a plurality of transducers, wherein each of the plurality of transducers is movably, concentrically connected to the central core member at a first position and connected to one of a plurality of vertebra plates at a second position; and
an energy transfer mechanism associated with said transducers,
wherein said plurality of transducers are capable of moving in an integrated undulating motion.

38. The apparatus of claim 37, wherein the central core member is flexible.

39. The apparatus of claim 37, wherein the central core member is rigid.

40. The apparatus of claim 37, wherein the transducers are driven by an actuation circuit to cause said undulating motion.

41. The apparatus of claim 37, wherein the transducers are caused to move in said undulating motion by external energy stimulus.

42. The apparatus of claim 37 wherein the apparatus is used as an energy generating device.

43. The apparatus of claim 37, wherein the apparatus is used as a propulsion device.

44. The apparatus of claim 37, wherein the actuation circuit includes a programmable control system.

45. The apparatus of claim 37, wherein the apparatus includes an energy generating circuit.

46. The apparatus of claim 37, wherein the transducers are each connected to said core member by a rigid member in cooperation with an elastic member, allowing movability of the transducer about the core member.

47. The apparatus of claim 46, wherein the elastic member includes a series of at least two elastic portions.

48. The apparatus of claim 47, wherein the elastic member includes an elastomer bearing concentric with both a transducer and the central core.

49. The apparatus of claim 37, further comprising a strain circuit for measuring strain on any component members.

50. The apparatus of claim 37, wherein the energy transfer mechanism includes at least one airfoil surface on each transducer.

51. The apparatus of claim 37, wherein the energy transfer mechanism is a continuous flexible membrane enclosing the plurality of transducers and the core member.

* * * * *